April 11, 1950  R. A. CHRISTIAN  2,503,800
TENS TRANSFER MECHANISM FOR TOTALIZERS
Original Filed July 21, 1944  12 Sheets-Sheet 1
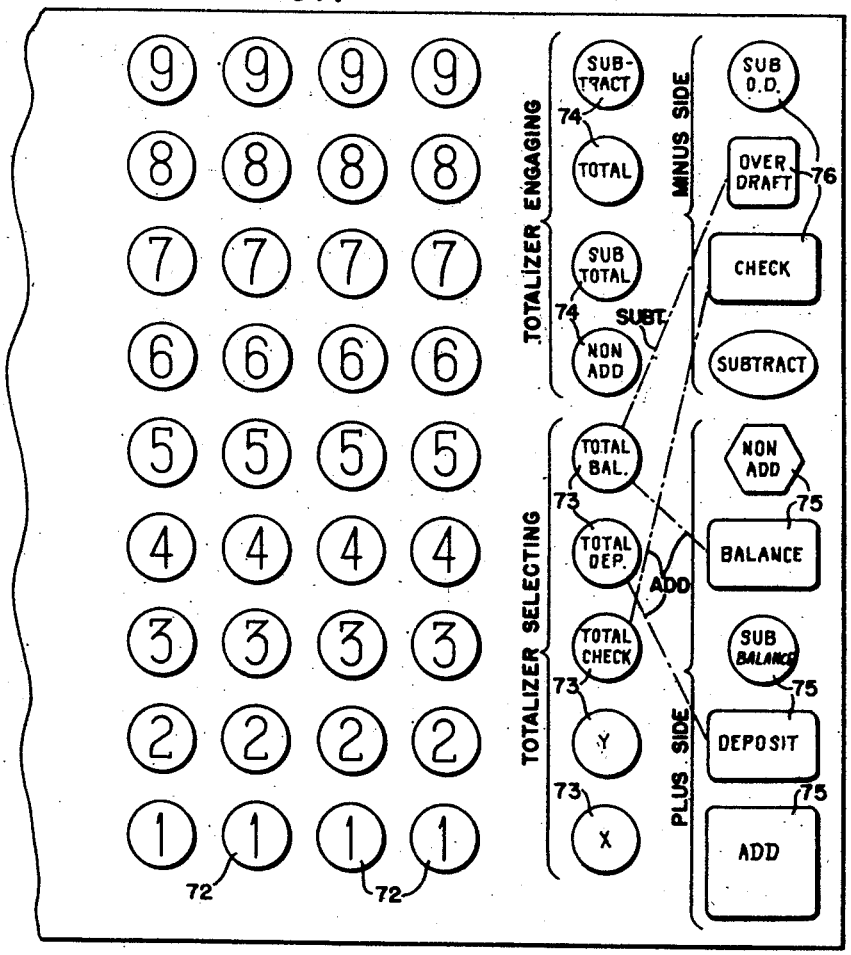
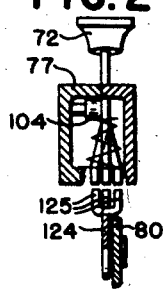
Inventor
RAYMOND A. CHRISTIAN
By
Carl Beust
His Attorney

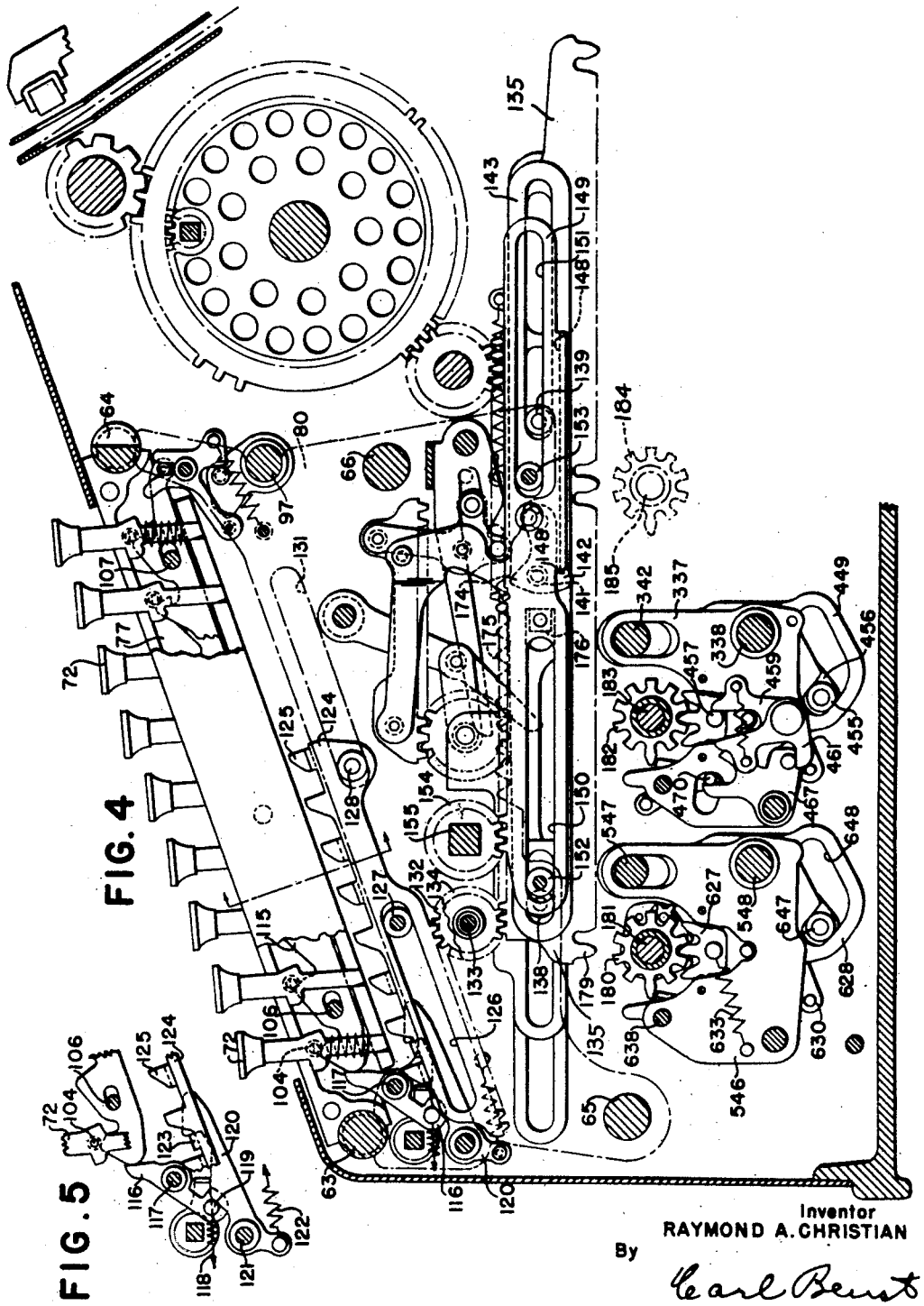

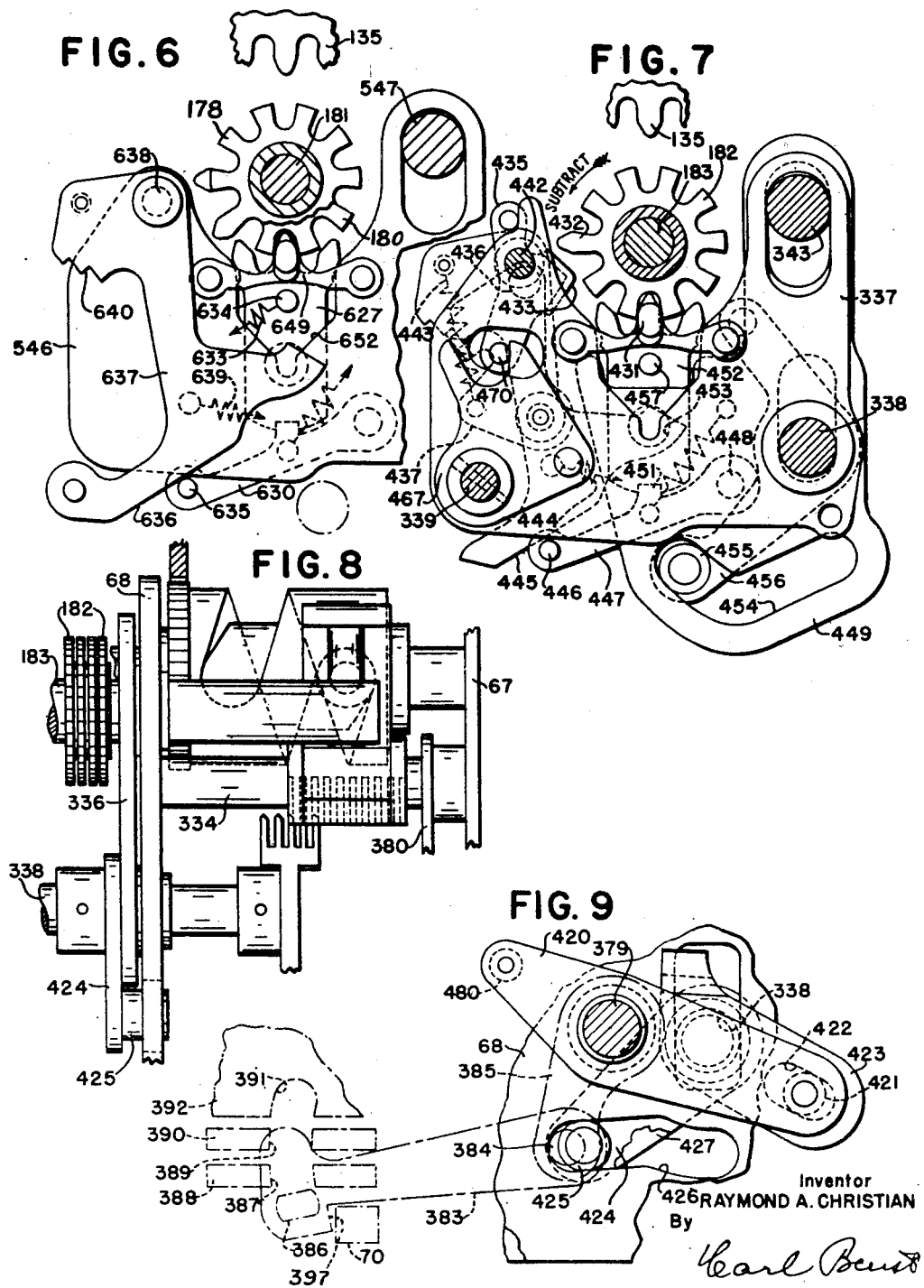

Inventor
RAYMOND A. CHRISTIAN
By
His Attorney

Inventor
RAYMOND A. CHRISTIAN
By
Earl Beust
His Attorney

April 11, 1950     R. A. CHRISTIAN     2,503,800
TENS TRANSFER MECHANISM FOR TOTALIZERS
Original Filed July 21, 1944     12 Sheets-Sheet 6

Inventor
RAYMOND A. CHRISTIAN
By Carl Benst
His Attorney

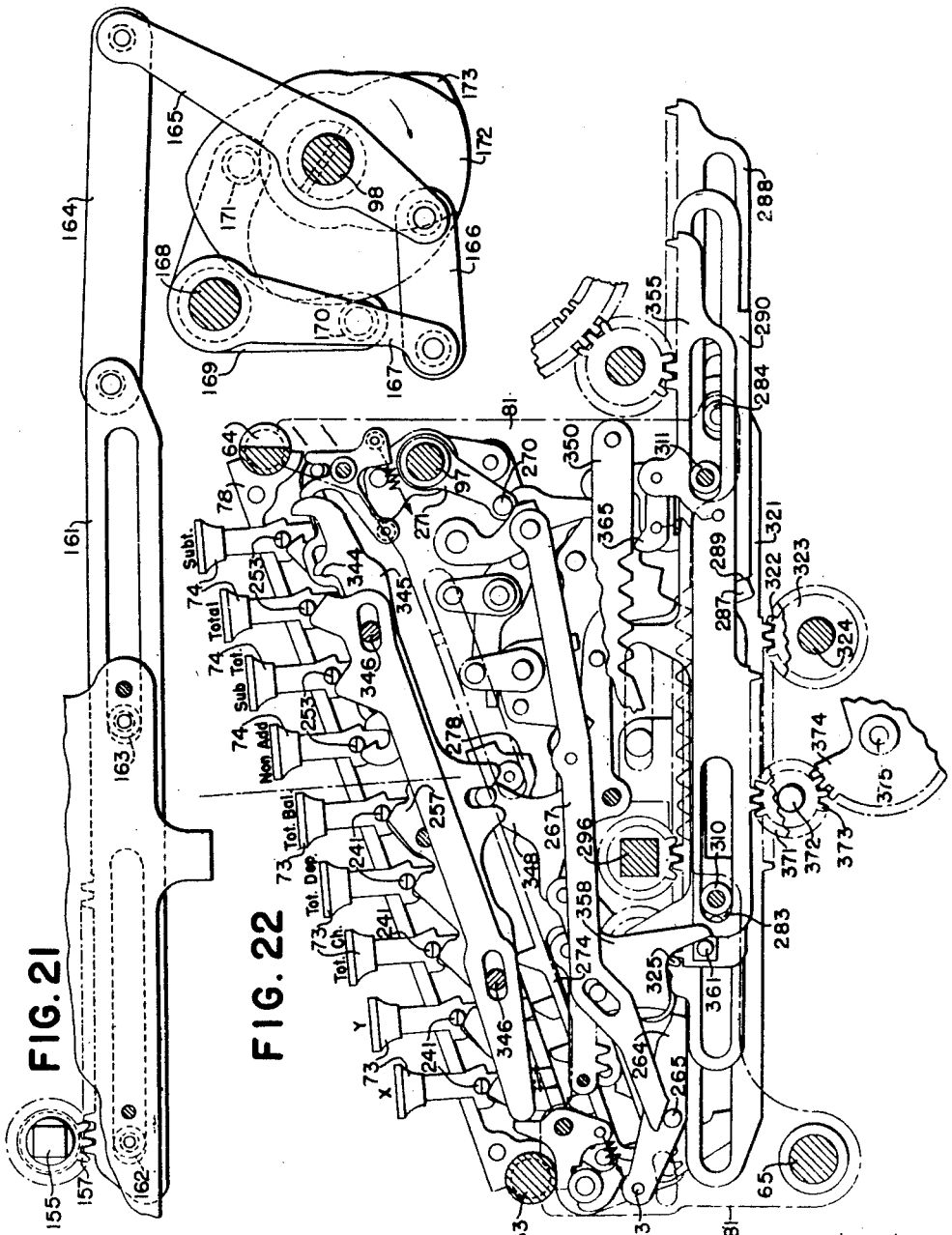

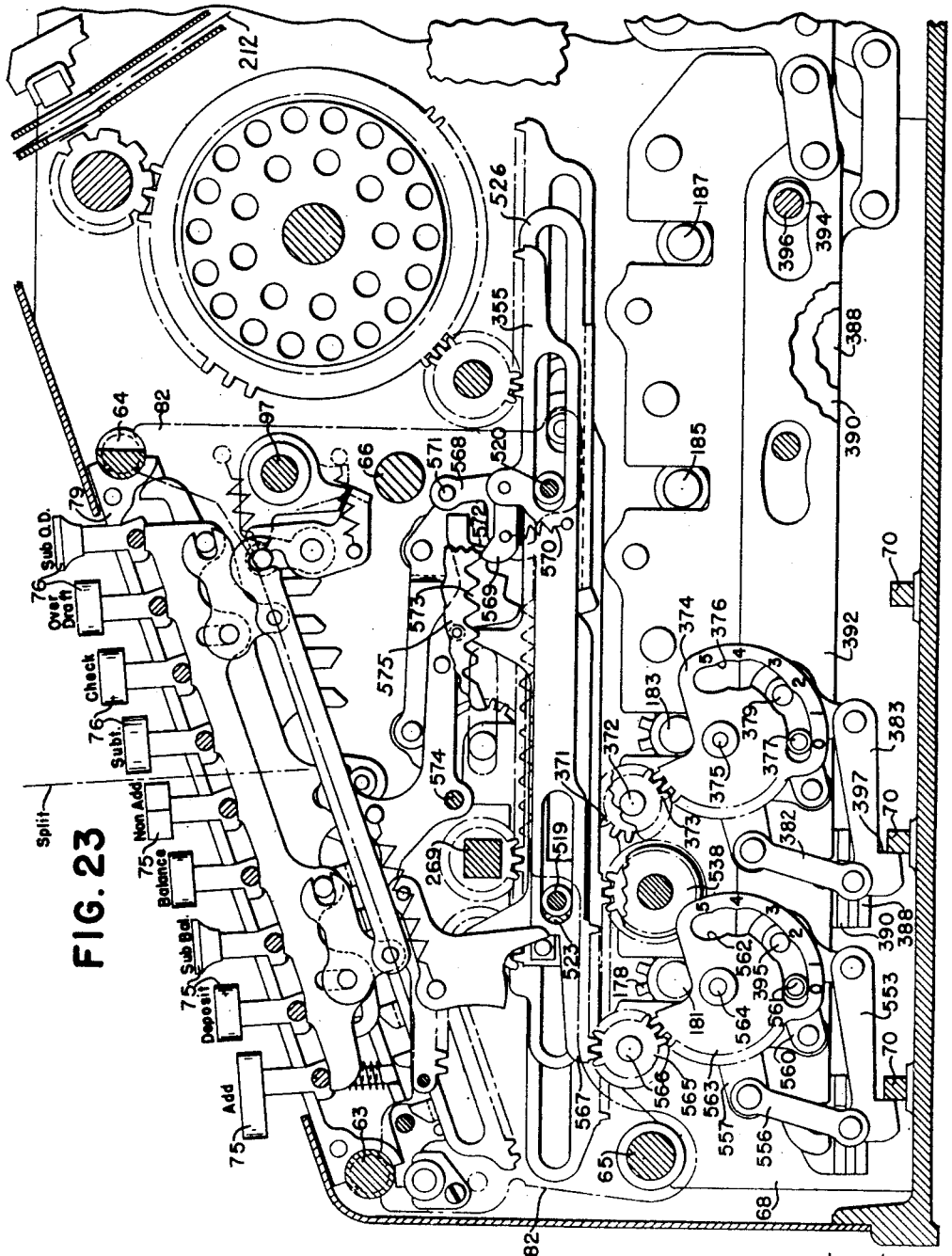

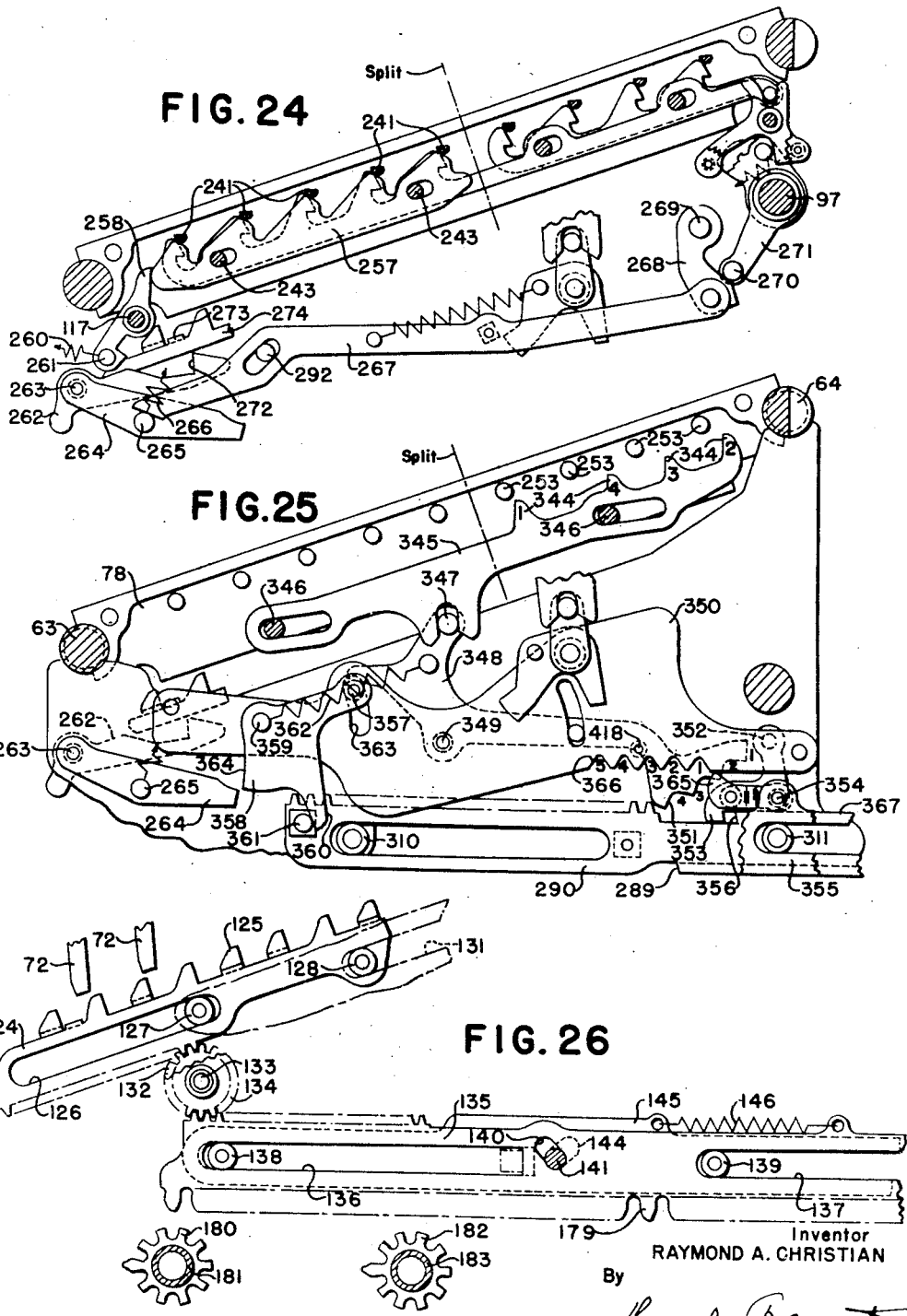

April 11, 1950 R. A. CHRISTIAN 2,503,800
TENS TRANSFER MECHANISM FOR TOTALIZERS
Original Filed July 21, 1944 12 Sheets-Sheet 10

Inventor
RAYMOND A. CHRISTIAN
By Earl Coenst
His Attorney

April 11, 1950  R. A. CHRISTIAN  2,503,800
TENS TRANSFER MECHANISM FOR TOTALIZERS
Original Filed July 21, 1944   12 Sheets-Sheet 11

Inventor
RAYMOND A. CHRISTIAN
By

Carl Benst

His Attorney

April 11, 1950 R. A. CHRISTIAN 2,503,800
TENS TRANSFER MECHANISM FOR TOTALIZERS
Original Filed July 21, 1944 12 Sheets-Sheet 12
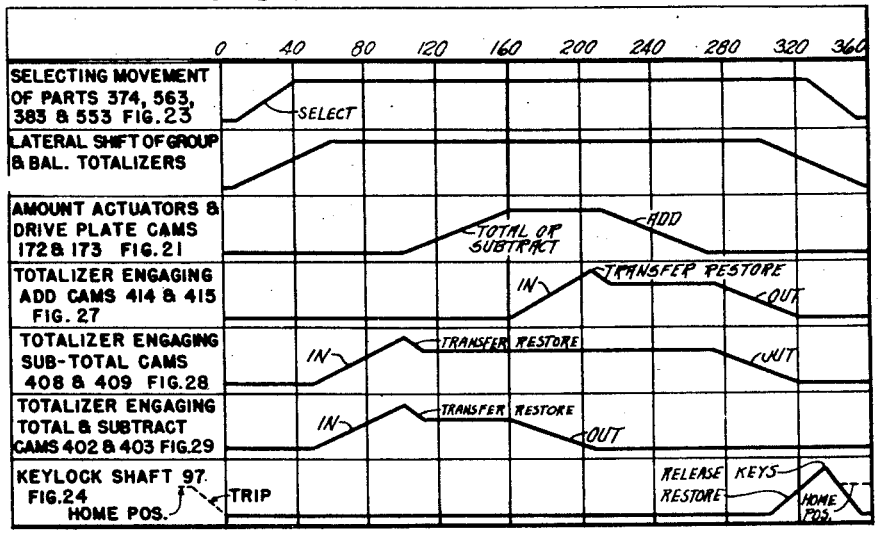
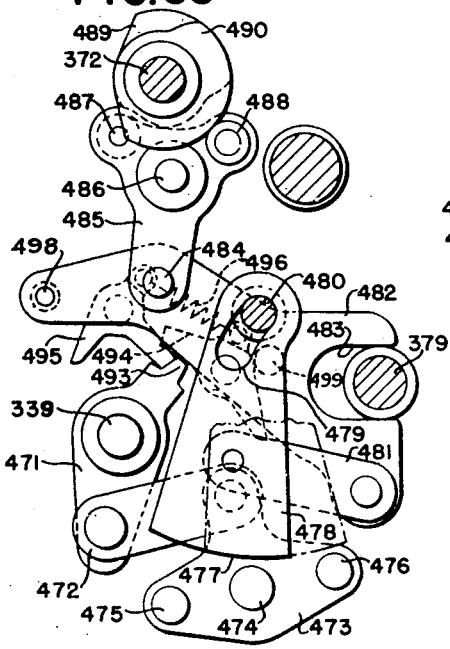
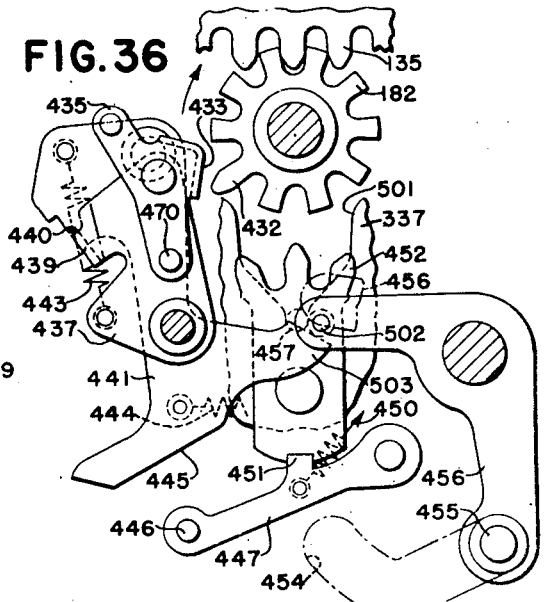
Inventor
RAYMOND A. CHRISTIAN
By
Carl Bunst
His Attorney Patented Apr. 11, 1950

2,503,800

UNITED STATES PATENT OFFICE 2,503,800

TENS TRANSFER MECHANISM FOR TOTALIZERS

Raymond A. Christian, Oakwood, Ohio, assignor to The National Cash Register Company, Dayton, Ohio, a corporation of Maryland Original application July 21, 1944, Serial No. 545,952. Divided and this application October 3, 1945, Serial No. 619,963

4 Claims. (Cl. 235—137)

This application is a divisional application of application Serial No. 545,952, filed July 21, 1944.

The invention relates to tens transfer mechanism for calculating machines and the like.

One object of the invention is to provide a tens transfer mechanism for use with a differential mechanism of the linear type.

Another object of the invention is to provide a novel mechanism for transferring tens digits from lower to higher denominations in adding operations and from higher to lower denominations in subtracting operations, said mechanism being incorporated in the totalizer mechanism.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

In the drawings:

Fig. 1 is a fragmentary view of the keyboard.

Fig. 2 is a cross-sectional view of one of the amount banks and the key stop slide associated therewith.

Fig. 3 is a top plan view showing the arrangement of the key stems of one of the amount banks and the arrangement of the corresponding projections on the key stop slide associated therewith.

Fig. 4 is a cross-sectional view taken just to the right of one of the amount banks and showing in particular the differential mechanism associated therewith.

Fig. 5 is a detail view of the zero latch mechanism associated with the amount bank shown in Fig. 4.

Fig. 6 is a detail view of a part of the transfer mechanism for one order of the balance totalizer.

Fig. 7 is a right side elevation of the group totalizer line showing the transfer mechanism associated with one denominational order thereof.

Fig. 8 is a detail view of the drum-type selecting cam for the group totalizer line.

Fig. 9 is a right side elevation of a part of the mechanism for shifting the group totalizer line to engage and disengage the sets of totalizer wheels thereon and the amount actuators.

Fig. 21 is a detail view of the driving mechanism for the amount differential mechanisms.

Fig. 22 is a right side elevation of the keyboard portion of the machine, showing the selecting and control keys for the group totalizer line and the differential and controlling mechanisms associated therewith.

Fig. 23 is a right side elevation of the machine, showing the control keys for the balance totalizer line and the differential mechanism and printing mechanism associated therewith. Likewise the mechanisms for controlling the engaging and disengaging movements of the group and balance totalizer lines are shown here.

Fig. 24 is a detail view of the bank of selecting and control keys for the group totalizer line and a part of the mechanism associated therewith.

Fig. 25 is a right side elevation of the mechanism controlled by the four upper keys of the group totalizer bank for controlling the engaging and disengaging movement of the group totalizer line.

Fig. 26 is a detail view of the key stop mechanism for one of the amount differentials and the totalizer actuator associated therewith.

Fig. 34 is a time chart depicting graphically the timing of the various mechanisms of the machine embodying the present invention.

Fig. 35 is a detail view showing the transfer shifting mechanism in adding position.

Fig. 36 is a detail view showing the transfer mechanism in fully restored position.

GENERAL DESCRIPTION

Figure 10:
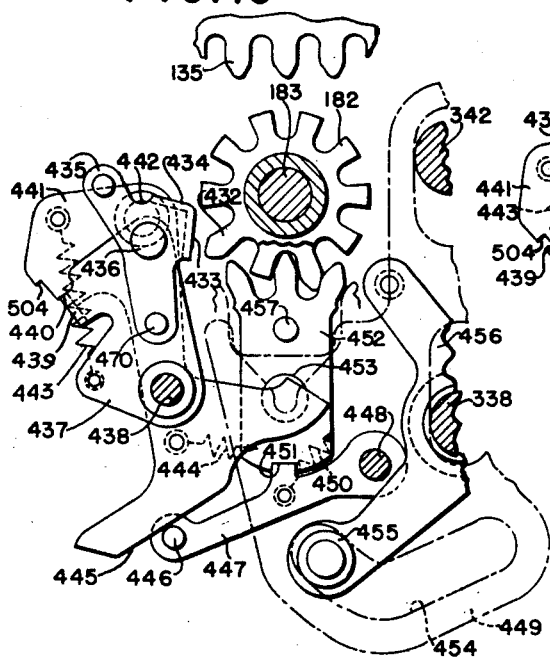
Fig. 10 is a right side elevation of one denominational order of the group totalizer line, showing said line in disengaged position and showing the transfer mechanism therefor in adding position.

The machine disclosed herein to illustrate the invention is provided with a plurality of denominational rows of amount banks, each of which contains nine amount keys numbered from 1 to 9. In the present arrangement there is no zero key, the normal or home position of the amount differential mechanism for each amount bank being zero, in which it is retained by a zero latch mechanism when no key is depressed in said amount bank.

Depression of any one of the amount keys in any denominational row moves its lower end into the path of a corresponding upward projection on a key stop slide mounted to reciprocate in parallel relationship to the lower ends of the amount keys. The key stop slide has on its lower edge teeth which mesh with a gear integral with another gear which meshes with rack teeth on the upper edge of an amount actuator rack mounted for horizontal reciprocating movement in relation to the wheels of the various totalizers. The amount actuator rack has therein an angular slot, through which extends a stud in a differential latch carried by a latch slide mounted for horizontal reciprocating movement in exactly the same manner as the actuator rack. The stud in the latch also extends through an angular slot in a latch retaining plate which is mounted to reciprocate in unison with the actuator rack and is connected thereto by a spring which urges said plate and said rack in opposite directions, causing the scissors action of the angular slots therein to normally retain the latch in engagement with a shoulder formed on the lower edge of a differential drive plate also mounted for horizontal reciprocating movement. The differential drive plate has, on its upper edge, teeth which are engaged by the teeth of a drive gear secured on a square shaft in turn connected to an amount differential operating cam, which drives the differential drive plate first forwardly and then back to normal position each machine operation to actuate the corresponding amount differential mechanism.

Initial forward movement of the differential drive plate causes the shoulder thereon, in cooperation with the latch, to carry the latch slide forwardly in unison therewith. Likewise, the stud carried by the latch, in cooperation with the angular slots in the actuator rack and the corresponding retaining plate, carries said rack and said retaining plate also forwardly in unison therewith. Forward movement of the actuator rack, through the gears connecting said rack to the key stop slide, shifts said slide rearwardly until the corresponding projection thereon contacts the lower end of the stem of the depressed amount key, which obstructs any further movement of the connected parts, including the actuator rack having the angular slot therein. Inasmuch as further forward movement of the actuator rack is obstructed, the angular slot therein, in cooperation with the stud in the latch, shifts said latch upwardly out of engagement with the shoulder on the differential drive plate while said plate continues the extent of its forward movement without interruption. Disengagement of the latch, as explained above, positions the actuator rack in accordance with the value of the depressed amount key and simultaneously engages an aliner tooth on said latch with a corresponding notch in an alining plate to aline and retain the actuator mechanism in set position.

The actuator rack has, on its lower edge, teeth which are engageable by the teeth of the corresponding totalizer wheels of one or more of the plurality of totalizer lines with which the illustrated machine is equipped.

In adding operations, after the actuator rack has been positioned, as explained above, in relation to the depressed amount key, the corresponding wheel or wheels of the selected totalizer line or lines are engaged with said actuator rack, and, upon return rearward movement of the differential drive plate, the shoulder thereon moves beyond the differential latch, which immediately drops therebehind, and a square stud carried by said drive plate engages the rearward end of a slot in the actuator rack to positively return said rack and connected parts rearwardly to normal position. Rearward movement of the actuator rack causes the wheels of the selected totalizer or totalizers to be rotated in an additive direction to enter therein the value of the depressed amount key.

Immediately after the actuator rack has completed its rearward movement, the corresponding wheel of the selected totalizer is disengaged therefrom. In subtract operations, the corresponding wheel of the selected totalizer is engaged with the amount actuator rack prior to its initial forward movement, which movement rotates said wheel in a reverse or subtractive direction to subtract therefrom the value of the depressed amount key.

The actuator rack for each denominational order has, on its lower edge, gear teeth arranged to be engaged by the teeth or corresponding totalizer gears on the various lines of totalizers with which the machine is provided. The number of totalizer lines with which the machine is provided may vary, depending upon the demands of the business system to which the machine is being adapted, and, if necessary or desirable, ten lines of totalizers may be incorporated in the machine by lengthening the actuator racks and providing teeth on its lower edge for actuating the wheels of said ten totalizer lines. However, for clearness and convenience, only two totalizer lines have been shown herein, both of said totalizer lines supporting totalizers of the add-subtract type. One of the totalizer lines, which is often referred to as the "balance totalizer" or "crossfooter," has a plus wheel and a minus wheel for each denominational order, said plus and minus wheels being geared together for reverse rotation, and is substantially the same type of totalizer as that disclosed in the Arnold Patent No. 1,873,733, dated August 23, 1932.

In adding operations, the plus side of the balance totalizer is engaged with the amount actuators, and, in subtract operations, the minus side of said balance totalizer is engaged with the actuators, the timing of engagement being the same in both cases. This type of construction for the balance totalizer provides a convenient means for securing a positive recording of the overdraft whenever desirable by totalizing or sub-totalizing the minus side of said balance totalizer. In this type of balance totalizer, a positive recording of the overdraft may be obtained in one cycle of operation of the machine, instead of the usual multicycles required with other types of totalizers.

A split bank of control keys for the balance totalizer controls the selection of its plus or minus side and likewise controls the timing of the engaging and disengaging movement of said balance totalizer.

The other line of totalizers with which the machine is provided is of the same general construction as the totalizers disclosed in the Williams Patent No. 2,189,851 and in the present arrangement has five sets of interspersed totalizer wheels for the storing of group totals. The group totalizer line is of the add-subtract type; in adding operations, the selected set of wheels is engaged with the amount actuator racks after said racks have been positioned under influence of the depressed amount keys, and return movement of said racks rotates said wheels in an additive direction to register the value of the depressed amount keys. In subtract operations, the selected set of totalizer wheels is engaged with the amount actuators prior to initial movement thereof, which movement reversely rotates said wheels in accordance with the value of the depressed amount keys.

A split bank of selecting and control keys controls the selection and the functions of the group totalizers, said bank comprising five selecting keys which control the lateral shifting of the group totalizer line to select the various sets of interspersed wheels thereon for engagement with the amount actuators, and four control keys which control the timing of the engaging and disengaging movement of the selected set of totalizer wheels with and from the amount actuators to effect the desired type of operation.

The group totalizer line is provided with a transfer mechanism which is in operative communication with the selected set of totalizer wheels, said transfer mechanism being automatically shifted from adding position to subtracting position, depending upon the type of operation being performed. Each of the totalizer wheels has thereon a long tooth corresponding to the zero position of said wheel, and, when a lower order totalizer wheel passes through zero while traveling in an additive direction, the long tooth thereon trips the transfer mechanism and causes "one" to be added in the next higher order. Likewise, in subtract operations, when a lower order totalizer wheel passes through zero while traveling in a subtractive direction, the long tooth thereon trips the transfer mechanism and causes "one" to be borrowed from the next higher order.

Keyboard in general

By referring to Fig. 1, which is a diagrammatic view of a portion of the keyboard of the machine embodying the present invention, it will be seen that said machine is provided with a plurality of rows of amount keys 72, a split row of group totalizer selecting and control keys 73 and 74, and a split row of balance totalizer control keys 75 and 76.

Each row of amount keys 72 is mounted in a key bank framework 77 (Figs. 2 and 4). The keys 73 and 74 are mounted in a similar key frame 78 (Fig. 22), and the keys 75 and 76 are mounted in a similar key frame 79 (Fig. 23), said key frames being removably mounted in the machine by means of half-round notches in each of its ends, which are engaged by the rods 63 and 64. Any or all of the key frames 77, 78, and 79 may be removed by turning the rod 64 (Figs. 4, 22, and 23) one-half revolution so that a cutaway portion thereof provides clearance for the notched upper ends of the key frames so that said key frames may be readily swung upwardly and removed from the machine.

Each amount bank is provided with a partition plate 80 (Figs. 2 and 4), which supports the corresponding differential mechanism for said banks. The group totalizer control bank is provided with a partition plate 81, which supports the differential mechanism therefor (Fig. 22), and the balance totalizer control bank is provided with a partition plate 82 (Fig. 23) for supporting the differential mechanism therefor. The partition plates 80, 81, and 82 are similar in outline and are supported by the rods 63, 64, 65, and 66.

Amount keys and amount differential mechanisms

Inasmuch as the construction of all the amount banks and their associated differential mechanisms is exactly the same, it is believed that a description of the amount bank shown in Fig. 4, which is one of the intermediate orders, and its associated differential mechanism will be sufficient for the purpose of this specification.

Each amount bank is provided with a zero latch mechanism which, when no amount key is depressed, latches the corresponding key stop slide and differential mechanism in zero position.

Depression of any one of the amount keys 72 (Figs. 4 and 5) causes the stud 104 therein, in cooperation with a camming surface formed on a corresponding upwardly-extending portion of a control plate 115, shiftably mounted by means of parallel slots therein in cooperation with studs 106 and 107, to shift said control plate forwardly. Forward movement of the control plate 115 causes a rounded nose on its forward end, in cooperation with an upward extension of a zero latch operating lever 116, free on a shaft 117 journaled in the plates 80, 81, and 82, to rock said lever 116 counter-clockwise (Fig. 5) against the action of a spring 118, which is tensioned to retain said lever and the control plate 115 in their clockwise and rearward positions, respectively. Counter-clockwise movement of the lever 116 causes a stud 119 in a downward extension thereof, in cooperation with a camming node formed on the upper edge of a zero latch 120 free on a stud 121 secured in the partition plate 80, to rock said latch clockwise against the action of a spring 122. Clockwise movement of the zero latch 120 moves a latching shoulder, formed thereon, out of the path of a bent-over ear 123 on a key stop slide 124 for this particular denomination, to free said slide for rearward positioning movement under influence of the corresponding amount differential mechanism.

Depression of any one of the amount keys 72 (Figs. 2, 3, 4, and 5) moves the lower end of its stem into the path of a corresponding stop lug 125 on the key stop slide 124, which slide is mounted for reciprocating movement in parallel relationship to the amount bank by means of a slot 126 therein, in cooperation with a roller 127 mounted on the partition plate 80, and by means of a roller 128 carried by said slide, in cooperation with a slot 131 in said partition plate 80. The key stop slide 124 (Figs. 4 and 26) has, on its lower edge, teeth which mesh with a gear 132 secured on a short shaft 133 journaled in the partition plate 80 and having also secured thereon another gear 134 meshing with teeth in the upper edge of an actuator rack 135 mounted to reciprocate horizontally by means of parallel slots 136 and 137 therein, in cooperation with corresponding rollers 138 and 139 free on studs in the partition plate 80. The actuator rack 135 has an angular slot 140, through which extends a stud 141 in a differential latch 142 (Fig. 4) pivotally mounted on a stud in a latch slide 143 mounted for horizontal reciprocating movement by means of parallel slots therein in cooperation with the rollers 138 and 139. The latch stud 141 also extends through an angular slot 144 (Fig. 26) in a latch retaining plate 145, mounted for horizontal reciprocating movement by means of parallel slots therein in cooperation with the rollers 138 and 139. A spring 146, tensioned between the actuator rack 135 and the retaining plate 145, urges said parts in opposite directions, causing the angular slots 140 and 144 therein, which are inclined in opposite directions, to yieldingly urge the stud 141 and the latch 142 (Fig. 4) downwardly or counter-clockwise to normally maintain a tooth of said latch in engagement with a shoulder 148 formed by a bent-over portion of a differential drive plate 149 mounted for horizontal reciprocating movement by means of parallel slots 150 and 151 therein in cooperation with corresponding rollers 152 and 153 free on studs secured in the partition plate 80 for the next lower order.

Figure 30:
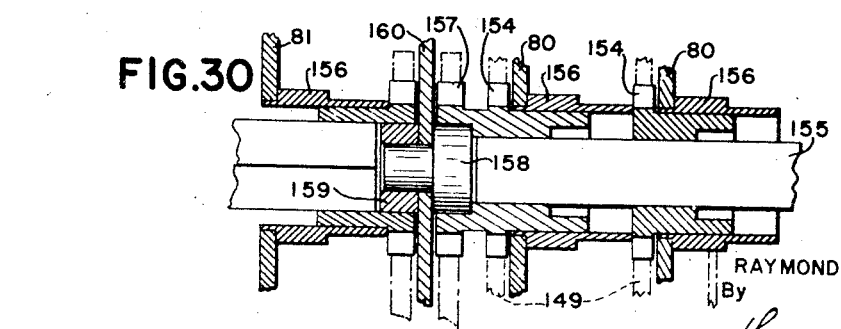
Fig. 30 is an enlarged sectional view of a portion of the driving mechanism for the amount and control differential mechanisms.

The differential drive plate 149 (Figs. 4 and 30) has, in its upper edge, teeth which mesh with a differential drive gear 154 having a square hole which engages a square shaft 155 (see also Fig. 21), said shaft and said gear being rotatably supported in the keyboard framework by means of the outside circumference of a sleeve portion of said gear 154 in cooperation with a boring in a hub 156 secured in the partition plate 80, as shown in Fig. 30. The square drive shaft 155 also engages a square hole in a sleeve portion of a drive gear 157, the periphery of said sleeve portion being free in a boring in a hub in the lowest order partition plate 80 to rotatably support said gear 157 and to assist in supporting the shaft 155. A counter-boring in the sleeve portion of the drive gear 157 bears on a trunnion stud 158, which, together with a companion collar 159, is secured to an intermediate support plate 160, similar to the partition plate 80 and supported in a similar manner, to assist in rotatably supporting the drive gear 157 and the right-hand end of the square shaft 155.

The gear 157 (Fig. 21) meshes with teeth in the upper edge of an amount differential drive rack 161 mounted for horizontal reciprocating movement by means of parallel slots therein in cooperation with corresponding rollers 162 and 163 carried by the plate 160. A link 164 pivotally connects the rear end of the rack 161 with the upper end of a lever 165 free on the main drive shaft 98. A link 166 pivotally connects the lower end of the lever 165 to an arm 167 free on a rod 168 supported by the main framework of the machine, said arm being connected by a hub to a cam lever 169 carrying rollers 170 and 171, which cooperate, respectively, with the peripheries of companion plate cams 172 and 173 secured on the main cam shaft 98. The cams 172 and 173 function according to the time given in space 3 of the time chart (Fig. 34) to reciprocate the rack 161 back and forth, which, through the gear 157, the shaft 155, and the gear 154, reciprocates the differential drive plate 149 (Fig. 4) first forwardly and then back to normal position according to the time given in the time chart.

Initial forward movement of the drive plate 149 (Fig. 4) causes the shoulder 148, in cooperation with the tooth of the latch 142, to carry the latch slide 143 forwadly in unison therewith, said latch 142, by means of the stud 141, also carrying the actuator rack 135 (Fig. 26) and the retaining plate 145 forwardly in unison with it. Forward movement of the actuator rack 135, through the gear 134, the shaft 133, and the gear 132, drives the key stop slide 124 rearwardly until the corresponding one of the lugs 125 engages the lower end of the stem of the depressed amount key 72. This interrupts further movement of the key stop slide 124, the actuator rack 135, and the retaining plate 145, thus causing the camming slot in said actuator rack 135, in cooperation with the stud 141, to shift the latch clockwise or upwardly to disengage the tooth thereof from the soulder 148 to disconnect said latch and connected parts from the drive plate 149 whereupon said parts are set in accordance with the value of the depressed amount key 72.

Clockwise disengaging movement of the latch 142 (Fig. 4) causes a tooth 174, formed on its upper edge, to engage a corresponding one of a series of alining notches 175 formed in the lower edge of the corresponding partition plate 80 to aline and hold the differential mechanism in set position. After the latch 142 has been disengaged, as explained above, the drive plate 149 (Fig. 4) completes its forward movement, during which the upper surface of the bent-over portion 148 moves beneath the latch 142 to lock the tooth 174, on said latch, in the alining notch 175 to insure that the differential mechanism is held in set position during the period that the selected totalizer is engaged and while the printing mechanism functions, as will be explained later.

After the wheels of the selected totalizer have been actuated, and after the printing mechanism has functioned, return movement of the differential drive plate 149, according to the time given in space 3 of the chart (Fig. 34) causes a stud 176 (Fig. 4), carried by said drive plate, to engage the rear end of the slot in the forward end of the latch slide 143 at the same time the shoulder 148 moves beyond the tooth of the latch 142, to cause said drive plate to pick up said latch slide 143 and connected parts and return them to normal positions.

The latch 142 (Fig. 4) and the stud 176 form a positive means for driving the actuator 135 in both positioning and return directions, and this latch mechanism functions similarly, in many respects, to the mechanism disclosed in the Placke Patent No. 2,176,561.

Figure 18:
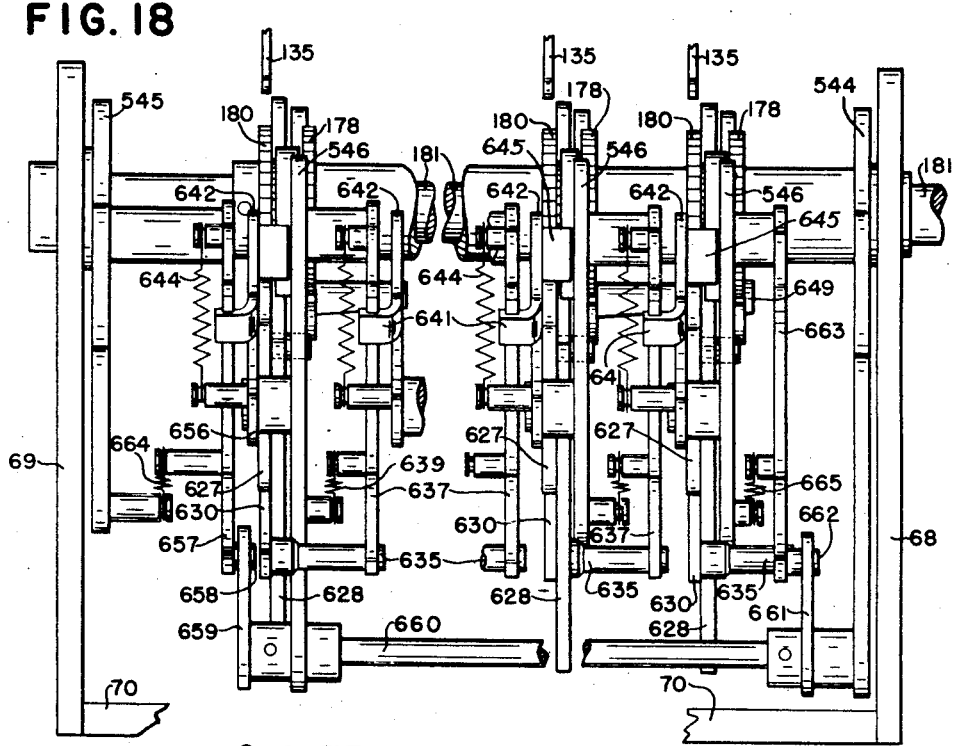
Fig. 18 is a fragmentary front elevation of the balance totalizer, showing in particular the "fugitive 1" mechanism.

The actuator rack 135 (Figs. 4 and 26) has, on its lower edge, a series of large gear teeth 179 arranged to be engaged by the corresponding plus or minus wheels 178 or 180 (Figs. 18, 19, and 20) of a balance totalizer line 181, and corresponding wheels 182, 184 (Figs. 4 and 26) and a similar wheel (not shown) of a respective group totalizer lines 183, 185, and 187 (see also Fig. 23).

In an adding or subtracting operation in which no amount key 72 is depressed, the zero latch 120 (Figs. 4 and 5) retains the keys stop slide 124 and the actuator rack 135 in home or zero position. This causes the latch 142 to be disengaged from the shoulder 148 immediately to position the latch slide 143 and connected parts in zero position.

Group totalizer key bank

A differential mechanism similar in many respects to the amount differential mechanism explained above is provided for the bank of selecting and control keys 73 and 74 (Figs. 1 and 22) for the group totalizer line.

The group totalizer line has thereon five sets of interspersed totalizer wheels which are selected for engagement with the amount actuators by the five selecting keys 73, while the control keys 74 (with the exception of the non-add key) control the timing of the engaging and disengaging movement of the selected set of group totalizer wheels. Therefore the key bank for the group totalizer selecting and control keys is of split construction inasmuch as it is necessary to depress one of the keys 73 to select the desired set of totalizer wheels, and it is also necessary to depress one of the keys 74 in the same operation, to control the engaging and disengaging movement of the selected set of totalizer wheels.

The studs 241 in the keys 73 (Figs. 22 and 24), when depressed, cooperate with corresponding camming projections on a control plate 257 shiftably mounted by means of parallel slots therein in cooperation with studs 243. A rounded nose on the forward end of the plate 257 cooperates with an upward extension of a lever 258 free on the shaft 117, said lever and the plate 257 being urged clockwise and rearwardly, respectively, by a spring 260, one end of which is connected to a stud 261 in the lower end of said lever. The stud 261 cooperates with a camming node on a zero latch 262 free on a stud 263 and having integral therewith an arm 264 with a stud 265 normally maintained in yielding contact with a downward extension of a bar 267 by a spring 266 tensioned to urge said arm 264 and the zero latch 262 in a counter-clockwise direction. The bar 267 is shiftably mounted by means of a slot in its forward end, in cooperation with a stud 292 in the partition plate 81, the rearward end of said bar being pivotally connected to an arm 268 free on a stud 269 in the plate 81. An arcuate surface on the arm 268 cooperates with a stud 270 in a crank 271 secured on the key lock shaft 97.

Figure 32:
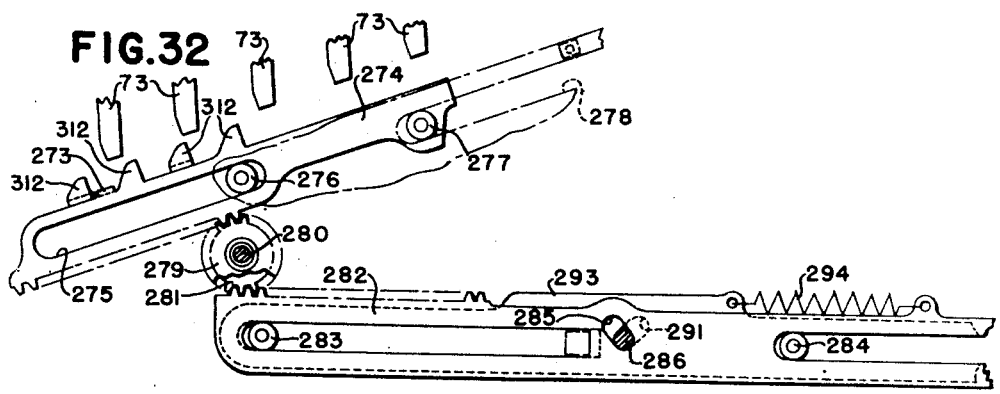
Fig. 32 is a detail of the key stop mechanism for the group totalizer differential mechanism.

When the key lock shaft 97 is in home position, as shown in Fig. 24, the stud 270, in cooperation with the arcuate surface on the arm 268, retains the bar 267 in its forward position to cause the downward extension of said bar, in cooperation with the stud 265, to retain the arm 264 and the zero latch 262 in their clockwise or ineffective positions, as shown here, against the action of the spring 266, to retain a latching shoulder 272 on said latch out of the path of a bent-over ear 273 on a key stop slide 274 for the totalizer selecting key 73. The key stop slide 274 (Figs. 22 and 32) is mounted to shift parallel in relation to the lower ends of the stems of the keys 73 by means of a slot 275 therein, in cooperation with a roller 276 mounted on the plate 81, and by means of a roller 277 carried by said slide, in cooperation with a slot 278 in said plate 81.

Counter-clockwise releasing movement of the key lock shaft 97 (Fig. 24) withdraws the stud 270 from the arm 268 to release said arm, the bar 267, the arm 264, and the zero latch 262 to the action of the spring 266. This immediately rocks the latch 262 upwardly or counter-clockwise, when no key 73 is depressed, to move the shoulder 272 into the path of the bent-over ear 273 to latch the key stop slide 274 in home or zero position, in which none of the group totalizers is selected for engagement with the amount actuators 135.

Depression of any one of the keys 73 causes the stud 241 therein, in cooperation with the corresponding camming projection on the plate 257, to shift said plate forwardly to rock the lever 258 counter-clockwise, against the action of the spring 260, to move the stud 261 into the path of the camming node on the upper edge of the zero latch 262, to retain the shoulder 272 on said latch out of the path of the bent-over ear 273, so that the key stop slide 274 is free to move rearwardly to select the set of group totalizer wheels 182 corresponding to the depressed selecting key 73, as fully explained in the parent case.

Group totalizer differential mechanism

The keys 73 control the selecting of the five sets of totalizers on the group totalizer line, through a minimum movement portion of the group totalizer split differential mechanism.

The keys 74, through the other portion of the split differential mechanism, control the timing of the engaging of the selected totalizer with the amount actuators, as will be described hereinafter.

The key stop slide 274 (Fig. 32) has, on its lower edge, rack teeth which mesh with a gear 279 secured, by a shaft 280 journaled in the partition plate 81, to a companion gear 281 meshing with teeth on the upper edge of a key stop rack 282 mounted for horizontal reciprocating movement by means of parallel slots therein in cooperation with rollers 283 and 284 mounted on the plate 81. The key stop rack 282 has an angular slot 285, through which extends a stud 286 in a latch 287, only a portion of which is shown in Fig. 22, but which is formed similarly to the latch 142 for the amount bank differential. The latch 287 is pivotally mounted on a latch slide 288 mounted for horizontal reciprocating movement by means of parallel slots therein in cooperation with the rollers 283 and 284. The latch 287 has a tooth arranged to engage a shoulder 289 formed on a bent-over portion of a differential drive plate 290 (Figs. 25 and 31) mounted for horizontal reciprocating movement by means of parallel slots therein in cooperation with rollers 310 and 311 free on studs secured in the right-hand face of the partition plate 81. The stud 286 (Fig. 32) in the latch 287 likewise extends through an angular slot 291 opposed to the slot 285, said slot being formed in a retaining plate 293 mounted adjacent the key stop rack 282 for reciprocating movement in unison therewith by means of parallel slots in cooperation with the rollers 283 and 284. A spring 294, tensioned between the rack 282 and the plate 293, urges said parts in opposite directions, thereby causing the sors action of the opposed angular slots 285 and 291 to yieldingly urge the stud 286 downwardly to normally retain the tooth of the latch 287 in engagement with the shoulder 289 to provide an operating connection between the differential drive plate 290 and the key stop rack 282.

Depression of any one of the selecting keys 73 (Figs. 1, 22, and 32), except the Total Balance key, moves the lower end of its stem into the path of a corresponding projection 312 formed on the upper edge of the key stop slide 274, whereupon, when the drive plate 290 moves forwardly, the drive plate 290 (Fig. 31), through the shoulder 289, in cooperation with the latch 287, carries the latch slide 288 and, through the stud 286, the retaining plate 293 (Fig. 32) and the key stop rack 282 forwardly in unison with it. Forward movement of the rack 282, through the gear 281, the shaft 280, and the gear 279, shifts the key stop slide 274 rearwardly until the projection 312 on its upper edge contacts the stem of the corresponding depressed key 73. This obstructs further movement of said key stop slide and the rack 282, whereupon the angular slot 285 in said rack, in cooperation with the stud 286, shifts the latch 287 upwardly or clockwise to disengage the tooth thereon from the shoulder 289 to disconnect said parts from the differential drive plate 290 and to position said parts in accordance with the depressed selecting key 73.

*Engaging and disengaging mechanism for group totalizer line*

Mechanism for imparting engaging and disengaging movement to the group totalizer shaft 183 (Fig. 8) to engage and disengage the selected set of totalizer wheels 182 with and from the amount actuators will now be explained.

The control keys 74 of the split bank of selecting and control keys for the group totalizer line are used in conjunction with the selecting keys 73 to control the engaging and disengaging movement of the set of totalizer wheels 182 selected for engagement with the amount actuators by said selecting keys 73.

Depression of any one of the control keys 74 moves the corresponding stud 253 (Figs. 22 and 25) downwardly into the path of a corresponding upward projection 344 on a control bar 345 mounted for parallel shifting movement in relation to the studs 253, by means of parallel slots therein, in cooperation with two studs 346 secured in the key frame 78. The bar 345 has a downwardly disposed slot which engages a stud 347 in an upward extension of a control lever 348 free on a stud 349 in an auxiliary plate 350 secured to the partition plate 81 for the group totalizer bank. A rearward extension of the lever 348 has, formed therein, four graduated steps 351 (see also Fig. 31) corresponding to the projections 344 and arranged to cooperate with a stud 352 in an upward arm of a latch 353 pivoted on a stud 354 in an engaging control rack 355 mounted for horizontal shifting movement by means of parallel slots therein, in cooperation with the rollers 310 and 311. The latch 353 has a downwardly projecting tooth adapted to be engaged by a shoulder 356 on the drive plate 290. A forward extension of the lever 348 (Figs. 22 and 25) cooperates with a stud 357 in a rearward extension of an arm 358 free on a stud 359 in the plate 350. The arm 358 has a downward extension 360, which cooperates with a round portion of a square stud 361 secured in the forward end of a differential drive plate 290. A spring 362, tensioned between the stud 359 and a stud in the lever 348, urges said lever 348 counter-clockwise (Fig. 25) to normally maintain its forward extension in contact with the stud 357, which extends through an arcuate slot 363 in the plate 350.

When none of the group totalizer selecting keys 73 is depressed (Figs. 1, 24, and 25), counter-clockwise movement of the zero latch 262 and the arm 264, upon counter-clockwise releasing movement of the key lock shaft 97, as explained above, causes the rear end of said arm 264 to move into the path of a forward wall 364 on the arm 358. This obstructs clockwise movement of the arm 358 when forward movement of the differential drive plate 290 withdraws the stud 361 from the downward extension 360, thereby locating the control lever 348 in its first or non-add position, so that, when none of the selecting keys 73 is depressed, no engaging and disengaging movement will be imparted to the group totalizer line, irrespective of whether or not a control key 74 is depressed.

Depression of any one of the selecting keys 73 causes the lever 258 (Fig. 24) to retain the zero latch 262 and the arm 264 in their downward positions, so that the arm 358 (Fig. 25) will be free to move clockwise upon forward movement of the plate 290. Clockwise movement of the arm 358, through stud 357 in cooperation with the forward extension of the lever 348, permits said lever to move counter-clockwise in unison therewith under influence of the spring 362. Counter-clockwise movement of the lever 348 shifts the bar 345 forwardly until the corresponding projection 344 contacts the stud 253 of the depressed control key 74 to position the corresponding step 351 on said lever opposite the stud 352 in the latch 353.

By referring to Fig. 25, it will be noted that the stud 352 is a sufficient distance from the first or non-add step 351 on the lever 348, and that the shoulder 356 on the differential drive plate 290 is a sufficient distance from the tooth on the latch 353 to permit said plate 290 to position said lever 348, under influence of the depressed control key 74, without danger of interference between said lever 348 and said stud 352.

Initial forward movement of the differential drive plate 290 (Figs. 25 and 31) causes the shoulder 356 to engage the tooth of the latch 353 to carry said latch and the rack 355 forwardly in unison therewith until the stud 352 contacts the step 351 corresponding to the depressed control key 74, to rock said latch 353 clockwise out of engagement with the shoulder 356 and simultaneously to engage a tooth on an alining pawl 365, secured to said latch 353, with the corresponding one of a series of alining notches 366 in the plate 350, to position the rack 355 in accordance with the depressed control key 74. After the latch 353 has been disengaged, continued forward movement of the drive plate 290 causes an upward surface 367 on said plate to pass beneath the tooth of said latch 353 to lock the pawl 365 in the corresponding alining notch 366 to aline and retain said latch and connected parts in set positions. A spring 368 (Fig. 31), tensioned between the latch 353 and a stud in the rack 355, urges said latch counter-clockwise to normally maintain the tooth thereon in the path of the shoulder 356.

The drive plate 290 is driven by a mechanism similar to that shown in Fig. 21. The cams for operating the drive plate actuate the mechanism according to the time shown in line 2, Fig. 34, and said mechanism is connected to the drive plate 290 by shaft 296 (Fig. 31) and gear 295, the latter meshing with teeth formed on the upper edge of the drive plate 290.

The rack 355 (Figs. 22, 23, and 31) has, on its lower edge, teeth meshing with the teeth of a gear 371 secured on one end of a short shaft 372 journaled in the frames 67 and 68. Also secured on the shaft 372 is a gear 373 meshing with teeth in a segment 374 free on a stud 375 in the frame 67. The segments 374 (Figs. 23) has a camming slot 376, into which extends a roller 377 (see also Fig. 33) carried by an arm 378 free on a totalizer engaging shaft 379 extending between the frames 67 and 68. A link 381 pivotally connects the forward end of the arm 378 to a lever 380 free on the stud 334 (Fig. 8) in the frame 67. The forward end of the lever 380 (Fig. 33) is pivotally connected by a link 382 to a totalizer engaging arm 383 free on a stud 384 in a crank 385 secured on the shaft 379. Secured in the forward end of the arm 383 (Figs. 9 and 33) is a flattened stud 386, which cooperates with a notch 387 in a bent-over extension of a subtract and total engaging bar 388, with a notch 389 in a bent-over extension of a sub-total engaging bar 390, and with a notch 391 in the lower edge of an add engaging bar 392. The engaging bars 388, 390, and 392 (Figs. 23, 27, 28, and 29) are shiftably mounted by means of arcuate slots therein in cooperation with rollers 393 and 394 rotatably supported, respectively, by shafts 395 and 396 for the No. 1 and No. 4 totalizer lines, said shafts being similar in every respect to the totalizer engaging shaft 379 for the No. 2 or group totalizer line now being described.

Figure 33:
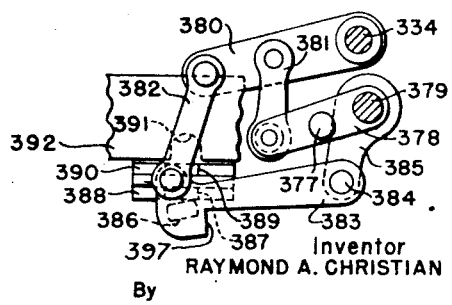
Fig. 33 is a detail view of a portion of the engaging and disengaging mechanism for the group totalizer line.

Near the end of each machine operation, the stud 361 in the differential drive plate 290 (Fig. 31) engages the forward end of the rack 355 and returns said rack rearwardly to normal position, as shown here, to in turn position the segment 374 in home or neutral position, as shown in Fig. 23. When the segment 374 is in home position, the slot 376, cooperating with the roller 377 and through the linkage shown in Fig. 33 and explained above, locates the engaging arm 383 in its extreme downward position, in which the stud 386 is beneath the notch 387 in the bar 388, as shown in Figs. 9 and 33, and therefore out of the operating range of all of the engaging bars. This extreme downward position of the arm 383 is termed its "non-add" position, and, when it is in this position, a shoulder 397 on said arm (Figs. 9 and 23) is in the path of the central one of the tie bars 70, to obstruct rearward or engaging movement of said arm and connected parts.

Depression of the Subtract key 74 in conjunction with one of the selecting keys 73 (Figs. 1 and 22) causes the rack 355 to be positioned in its second or subtract position, which movement of said rack, through the gears 371 and 373, rotates the segment 374 (Fig. 23) to its second position, causing the cam slot 376, in cooperation with the roller 377, and through the linkage shown in Fig. 33, to raise the engaging arm 383 to its subtract position, in which the stud 386 is engaged with the notch 387 (Figs. 9 and 23) in the subtract and total engaging bar 388. The engaging bar 388 (Fig. 29) is connected by a link 398 to a lever 399 free on the rod 168. The lever 399 carries rollers 400 and 401, which cooperate, respectively, with the peripheries of companion plate cams 402 and 403 secured on the main cam shaft 98. Revolution of the main cam shaft 98 and the cams 402 and 403 during machine operation causes the engaging bar 388 to be shifted first rearwardly and then back to normal position, according to the time given in space 6 of the time chart, Fig. 34, to cause the selected set of group totalizer wheels corresponding to the depressed key 73 to be engaged with and disengaged from the amount actuators 135 in subtract timing.

Depression of the total key 74 in conjunction with one of the keys 73 (Figs. 22 and 25) causes the rack 355 to be located in its third position, which movement of said rack, through the gears 371 and 373 (Fig. 23), positions the segment 374 in its third position, thereby causing the camming slot 376, in cooperation with the roller 377 and the connecting linkage, to position the engaging arm 383 exactly the same as in subtract operations, to engage the stud 386 (Fig. 9) with the notch 387 in the total and subtract engaging bar 388. It is therefore evident that, in total recording operations, the set of totalizer wheels 182 corresponding to the depressed key 73 will be engaged with and disengaged from the amount actuators 135 in exactly the same timing as in subtract operations.

Depression of the sub-total key 74 in conjunction with one of the keys 73 (Figs. 22 and 25), through the control lever 348, causes the rack 355 to be located in its fourth position, said rack in turn moving the segment 374 (Fig. 23) to its fourth position. Movement of the segment 374 to its fourth position causes the slot 376, in cooperation with the roller 377 and the linkage connecting said roller to the engaging arm 383, to move said arm upwardly to a position where the stud 386 engages the notch 389 in the sub-total engaging bar 390. The sub-total engaging bar 390 (Fig. 28) is connected by a link 404 to a lever 405 free on the rod 168, said lever carrying rollers 406 and 407, which cooperate, respectively, with the peripheries of companion plate cams 408 and 409 secured on the main shaft 98.

Rotation of the main shaft 98 and the cams 408 and 409 causes the engaging bar 390 to be shifted first rearwardly and back to normal position, according to the time given in space 5 of the time chart, Fig. 34, to engage and disengage the set of totalizer wheels 182 corresponding to the depressed key 73 with and from the amount actuators in sub-total timing.

When the zero latch 262 for the keys 73 is rendered ineffective by depression of any one of the group totalizer selecting keys 73 (Figs. 22 and 24), as explained above, and when no control key 74 is depressed, the bar 345 (Fig. 25) and the control lever 348 are free to move full distance forwardly and counter-clockwise, respectively, which movement is determined by the stud 357 in the arm 358 contacting the bottom of the slot 363. Full movement of the control lever 348 moves all of the steps 351 out of the path of the stud 352, and in this case the rack 355 moves forwardly under influence of the differential drive plate 290 until the upward extension of the latch 353 engages a stud 418 in the plate 350 and is rocked clockwise thereby to disengage the tooth thereon from the shoulder 356 and simultaneously to engage the pawl 365 with the fifth notch 366 to position said rack 355 in adding position.

Forward movement of the rack 355 to adding position, through the gears 371 and 373 (Fig. 23), rotates the segment 374 clockwise to its fifth or adding position. When the segment 374 is in adding position, the camming slot 376 therein, in cooperation with the roller 377 and the linkage connecting said roller to the engaging arm 383, rocks said engaging arm full distance clockwise or upwardly (Fig. 9) to engage the stud 386 with the notch 391 in the lower edge of the add engaging bar 392. The add engaging bar 392 (Fig. 27) is connected by a link 410 to a lever 411 free on the rod 168, said lever carrying rollers 412 and 413, which cooperate, respectively, with the peripheries of companion plate cams 414 and 415 secured on the main shaft 98. Rotation of the main shaft and of the cams 414 and 415 causes said cams to shift the add engaging bar 392 first rearwardly and back to normal position according to the time given in space 4 of the time chart, Fig. 34, to engage and disengage the set of group totalizer wheels 182 corresponding to the depressed key 73 with and from the amount actuators in adding time.

By referring to Figs. 9 and 33, it will be recalled that the engaging arm 383 for the group totalizer line is pivotally connected to the crank 385 secured on the shaft 379. The shaft 379 also has secured thereon a lever 420 carrying a stud 421, which engages a slot 422 in an arm 423 secured on the shaft 338. Also secured on the right-hand end of the shaft 338 is a crank 424 carrying a roller 425, which engages a camming slot 426 in the plate 68. Secured on the left-hand end of the shaft 338 (Fig. 9) is a crank 427, similar in every respect to the crank 424 and carrying a roller, similar to the roller 425, which engages a slot similar to the slot 426 in the left-hand plate 69.

Rearward movement of the engaging arm 383 under influence of the engaging bars 388, 390, or 392, as explained above, rocks the crank 385, the shaft 379, and the lever 420 counter-clockwise (Figs. 9, 14, and 17), causing said lever 420 to rock the arm 423, the shaft 338, and the cranks 424 and 427 also counter-clockwise. Counter-clockwise movement of the cranks 424 and 427 causes the rollers 425 carried thereby, in cooperation with the corresponding slots 426, to shift the shaft 338 and the group totalizer framework, comprising said shaft, the plates 336 and 337, the shaft 339, and the group totalizer shaft 183, upwardly to engage the selected set of wheels 182 on said group totalizer line with the amount actuators 135. Return forward movement of the engaging bars 388, 390, or 392 reverses the procedure outlined above to shift the group totalizer framework downwardly to disengage the selected set of wheels 182 from the amount actuators 135. The shifting movement of the engaging bar 388, 390, or 392 with which the stud 386 (Fig. 9) is engaged determines the timing of the engaging and disengaging movement of the group totalizer line 183.

In adding operations, the stud 386 in the engaging arm 383 (Fig. 9) is engaged with the notch 391 in the add engaging bar 392, which bar operates according to the time given in space 4 of the chart, Fig. 34, to engage the wheels 182 of the selected totalizer with the amount actuators 135 after said actuators have completed their initial movements and have been positioned under influence of the depressed amount keys 72. Compare spaces 3 and 4, Fig. 34. The selected set of totalizer wheels remain in engagement with the amount actuators 135 during their return movement, which movement rotates said wheels in an additive or clockwise direction to add therein the value of the depressed amount keys. After the amount actuators have completed their return movement, the add engaging bar 392 moves forwardly to shift the group totalizer framework downwardly to disengage the selected set of totalizer wheels from said amount actuators 135.

In subtract operations, the stud 386 (Fig. 9) is engaged with the notch 387 in the engaging bar 388, and initial rearward movement of said bar shifts the group totalizer framework upwardly, according to the time given in space 6 of the chart, Fig. 34, to engage the wheels 182 of the selected group totalizer with the amount actuators 135 prior to initial forward movement of said actuators (compare spaces 3 and 6, Fig. 34). Initial movement of the actuators in subtract operations reversely rotates the selected set of totalizer wheels 182 (Fig. 15) to subtract therefrom the value of the depressed amount keys. After the amount actuators 135 have completed their initial movement, the engaging bar 388 (Fig. 9) shifts the engaging arm 383 forwardly to move the group totalizer framework downwardly to disengage the selected set of totalizer wheels from the amount actuators prior to return rearward movement of said actuators.

Transfer mechanism for group totalizers

Each denominational unit of the group totalizer line is provided with a transfer mechanism for transferring tens digits from lower to higher denominational orders in adding operations, and for transferring tens digits from higher to lower denominations in subtracting operations. In adding operations, when a totalizer wheel 182 in a lower order passes through zero, the long tooth thereon trips the transfer mechanism. This releases the transfer segment in the next higher order, and, when the totalizer wheels are disengaged from the amount actuators, the released transfer segment rotates the next higher order wheel one tooth space or step in an additive direction to transfer the tens digits thereto. In subtracting operations, the direction of movement of the transfer segments is changed to drive said segments in a subtractive direction instead of in an additive direction, and, when a lower order wheel passes through zero, the long tooth thereon trips the transfer mechanism as before, and, immediately after the selected totalizer is disengaged from the amount actuators, the transfer segment for the next higher order rotates the next higher order totalizer wheel one step in a subtractive direction to transfer a tens digit to the next higher denomination.

Inasmuch as the transfer mechanism is substantially duplicated for each denominational order, it is believed that a description of the transfer mechanism for the amount bank shown in Fig. 4 will be sufficient.

Each of the totalizer wheels 182 (Figs. 7, 10, 11, 12, 13, 15, and 16) has a long tooth 432, which cooperates with an add tripping surface 433 and a subtract tripping surface 434 on a transfer tripping pawl 435 pivoted on a stud 436 in a corresponding latch 437 free on a stud 438 in the corresponding partition plate 337. The latch 437 has a bent-over ear 439, whose upper edge cooperates with a shoulder 440 on a transfer segment release arm 441 free on a stud 442 in the next higher order partition plate 337. A spring 443, tensioned between the arm 441 and the latch 437, urges said latch clockwise to normally maintain the upper edge of the ear 439 in engagement with the shoulder 440 to retain said arm 441 against the action of a spring 444 tensioned to urge said arm counter-clockwise. The arm 441 has a camming surface 445, which cooperates with a stud 446 in a detent arm 447 free on a stud 448 in a transfer segment support plate 449 for the next higher order, said plate being mounted for vertical shifting movement in relation to the totalizer framework by means of parallel slots therein in cooperation with the stationary rod 342 and the totalizer engaging shaft 338, respectively.

A spring 450 urges the detent 447 clockwise to normally maintain a tooth 451 thereon engaged with a notch in the lower edge of a transfer segment 452 for the next higher order, free on a stud 453 in the plate 449, to normally hold said segment in neutral or untripped position. There is a plate 449 for each denominational order, and each of said plates has a camming slot 454 engaged by a roller 455 in a corresponding operating bell crank 456 secured on the totalizer engaging shaft 338.

Each of the segments 452 is in alinement with the corresponding amount actuator 135, and each of said segments has teeth which mesh with the teeth of the selected set of group totalizer wheels 182, when the group totalizer line is in disengaged position and when said line is moving to and from engaged position, to retain the selected set of wheels 182 in alinement. Thus the segments 452 serve in a dual capacity as aliners and transfer media. The other four sets of wheels 182 are retained in alinement by fixing alining bars 431 (Fig. 7), one of which is secured to each of the partition plates 337.

The transfer segment 452 (Figs. 13, 15, and 16) carries a stud 457, which cooperates with an operating surface 458 on an add operating arm 459, and with a similar surface 460 on a subtract-operating arm 461, both of said arms being pivoted on a stud 462 in the partition plate 337. A spring 463, tensioned between the arms 459 and 461, urges said arms in opposite directions—that is, counter-clockwise and clockwise, respectively—to cause said arms to actuate the transfer segment 452, as will be explained presently, and to cause corresponding extensions 464 and 465 of said arms to cooperate with a stud 466 in a control arm 467 secured on the shaft 339. A notch in the upper end of the arm 467 forms surfaces 468 and 469, which cooperate with a stud 470 in the lower end of the trip pawl 435, to shift said trip pawl from adding position to subtracting position and vice versa, depending upon the type of operation being performed.

Also secured on the shaft 339 (Figs. 14, 15, 16, and 17) is a transfer shaft operating arm 471 pivotally connected, by a link 472, to a lever 473 free on a stud 474 in the frame 68. The lever 473 has symmetrical extensions supporting studs 475 and 476, which cooperate with an arcuate surface 477 on a segment 478 having, in its upper end, a slot 479, which engages a stud 480 in a forward extension of the lever 420. The segment 478 is shifted in relation to the studs 475 and 476 through a link 481, which pivotally connects said segment to a shifting pitman 482 having, in its rearward end, a slot 483 shiftably engaging a bushing on the shaft 379. The pitman 482 carries a stud 484, which freely engages a hole in a downward extension of a Y-shaped cam lever 485 free on a stud 486 in the frame 68. The lever 485 carries rollers 487 and 488, which cooperate, respectively, with the peripheries of companion plate cams 489 and 490 secured on the shaft 372 (Fig. 14).

Figure 15:
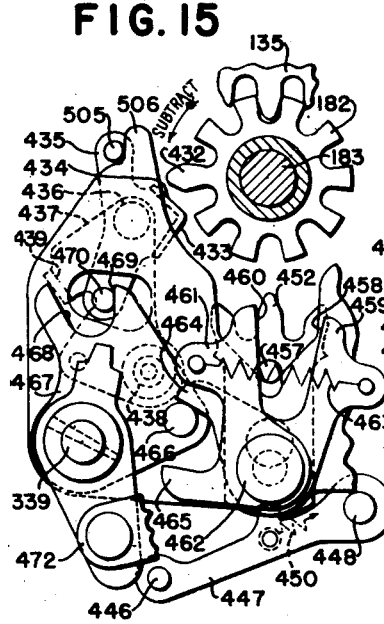
Fig. 15 is a detail view of the transfer mechanism for one denominational order of the group totalizer line, showing said transfer mechanism in subtract position.
Figure 14:
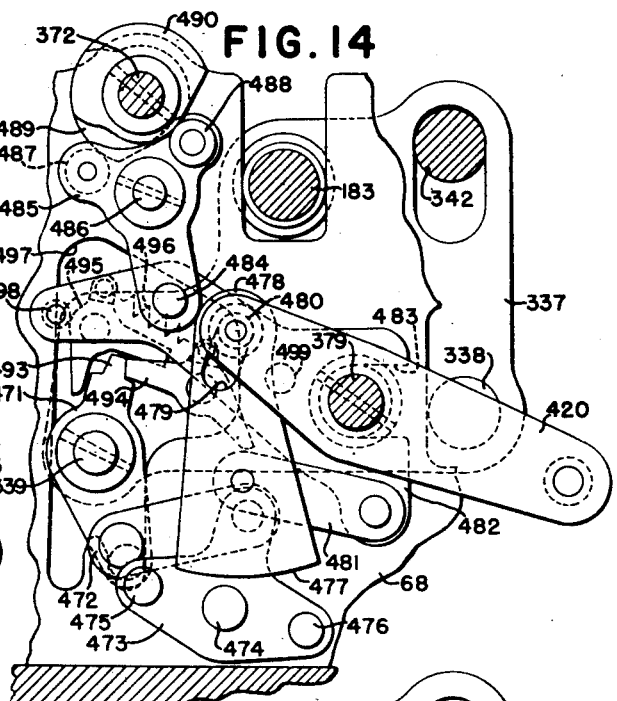
Fig. 14 is a right side elevation of the group totalizer line, showing the mechanism for shifting the transfer mechanism from adding position to subtracting position and vice versa.
Figure 16:
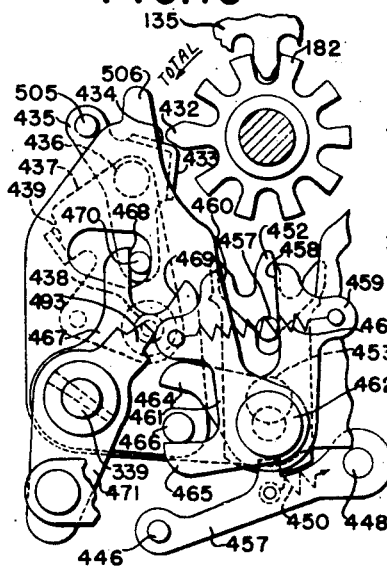
Fig. 16 is a detail view of the mechanism shown in Fig. 15 in adding position.
Figure 17:
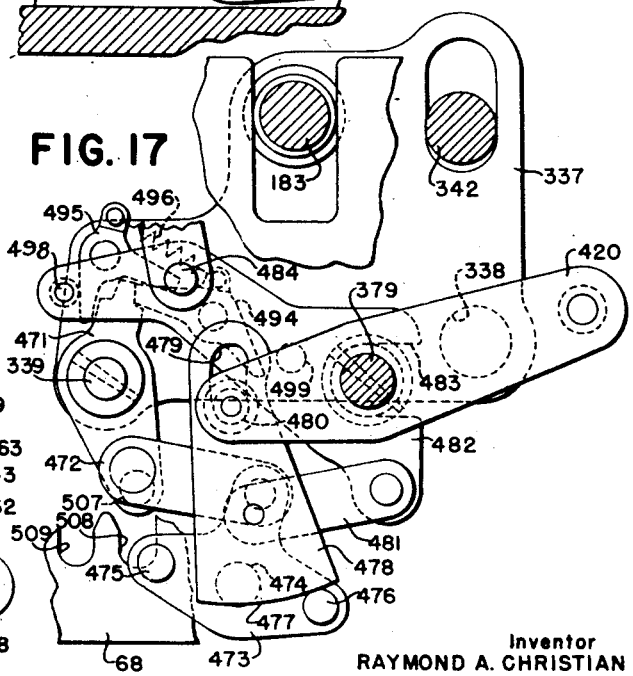
Fig. 17 is a detail view of a part of the mechanism shown in Fig. 14, for shifting the transfer trip pawls from adding position to subtracting position and vice versa.

The shaft 339 and the arms 471 and 467 have two positions, namely, subtract position, as shown in Figs. 14, 15, and 17, and adding position, as shown in Figs. 16 and 35. The shaft 339 and parts secured thereon are retained in subtract position by a tooth 493 formed on the upper end of the arm 471, in cooperation with a subtract retaining pawl 494, and said parts are retained in adding position by said tooth in cooperation with an add retaining pawl 495, said pawls having tensioned between them a spring 496, which urges them into engagement with said tooth 493. The pawls 494 and 495 are pivotally mounted on their respective studs secured in the right-hand plate 336, and said pawls extend through a clearance opening 497 in the frame 68, so as to cooperate with the tooth 493 on the arm 471, which arm, it will be seen by referring to Fig. 14, is also located to the right of the frame 68 on the right-hand end of the shaft 339, which also extends through said opening 497.

The cams 489 and 490 (Figs. 14 and 35), under influence of the keys 73 and 74, position the lever 485 in either of two positions (add and subtract) to cause said pitman in turn to control the positioning of the shaft 339 accordingly.

Figure 31:
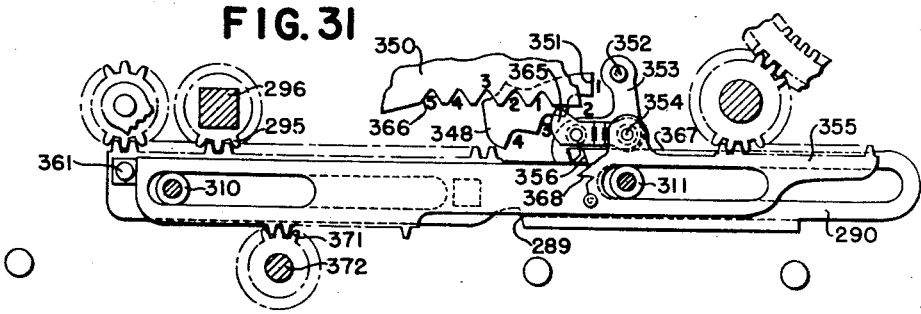
Fig. 31 is a detail view showing in particular the driving mechanism for the group totalizer differential mechanism.

By referring to Figs. 22, 23, and 31, it will be recalled that the shaft 372 is positioned at the beginning of machine operation (space 2, Fig. 34), by the rack 355 under influence of the control keys 74 in any one of four positions—namely, non-add, subtract, total, and sub-total—and, when no key 74 is depressed and one of the keys 73 is depressed, said shaft is positioned in add position. At the end of each machine operation, the rack 355 and the shaft 372 are returned to home or zero position, as shown in Figs. 23 and 31, by the stud 361 in the differential drive plate 290, in the manner explained previously.

When the shaft 372 and the cams 489 and 490 are positioned under influence of the non-add or subtract control keys 74, in either non-add or subtract position, said cams in turn position the lever 485 in subtract position, as shown in Fig. 14, to shift the pitman 482 rearwardly. Rearward shifting of the pitman 482, through the link 481, rocks the segment 478 counter-clockwise, so that the arcuate surface 477 is directly above the stud 476 in the lever 473, as shown in full lines in Fig. 14.

With the shaft 339 and the arm 471 in adding position, as shown in Fig. 35, in which they are retained by the pawl 495 and the tooth 493, and with the segment 478 in subtract position, as shown in full lines in Figs. 14 and 17 and as shown in dot-and-dash lines in Fig. 35, upward engaging movement of the totalizer framework, including the plates 336 and 337, the shaft 339, and the transfer mechanism supported by said plate 337, under influence of the mechanism shown in Fig. 9 and explained earlier, causes an extension of the pawl 495 to engage a stud 498 in the forward end of the pitman 482 to rock said pawl counter-clockwise against the action of the spring 496 out of engagement with the tooth 493. While the pawl 495 is being disengaged, the slot 479 in the segment 478 permits the lever 420 and the stud 480 to move counter-clockwise independently of said segment, and, immediately after said pawl is disengaged, said lever 420 shifts the segment 478 downwardly, causing the arcuate surface 477, in cooperation with the stud 476 (Fig. 35), to rock the lever 473 clockwise to the position shown in Fig. 17.

Clockwise movement of the lever 473, through the link 472, rocks the arm 471 and the shaft 339 counter-clockwise from adding position, as shown in Figs. 16 and 35, to subtracting position, as shown in Figs. 14 and 17. During counter-clockwise movement of the arm 471, the tooth 493 by-passes the end of the subtract retaining pawl 494, whereupon the spring 496 moves said pawl into the path of said tooth to secure said arm 471 and the shaft 339 in subtract position.

In operations in which none of the selecting keys 73 or the control keys 74 is depressed, the shaft 372 is positioned in its first or non-add position, in which the cams 489 and 490 (Fig 14) position the lever 485 and the pitman 482 in subtract position. However, in all non-add operations, no engaging or disengaging movement is imparted to the totalizer framework, the lever 420, and the segment 478; therefore the lever 473 is not shifted, and, under these conditions, the position of the shaft 339 is not disturbed; consequently said shaft remains in position which it occupied prior to the non-adding operation.

By referring to Figs. 22 and 31, it will be recalled that, when one of the selecting keys 73 is depressed and none of the control keys 74 is depressed, the rack 355 is free to move full distance forwardly to adding position, to position the shaft 372 and the cams 489 and 490 in their fifth or adding position, as shown in Fig. 35. Movement of the cams 489 and 490 to adding position rocks the lever 485 clockwise to shift the pitman 482 forwardly to adding position, said pitman in turn rocking the segment 478 clockwise from substracting position, as shown in dot-and-dash lines (Fig. 35), to adding position, as shown here in full lines.

Assuming that the shaft 339 and the arm 471 are in subtracting position, as shown in Figs. 14 and 17, and that the pitman 482 is in the add position shown in Fig. 35, upward engaging movement of the totalizer framework causes a stud 499, carried by the pitman 482, to be engaged by an extension of the pawl 494 to rock said pawl clockwise out of engagement with the tooth 493. After the pawl 494 has been disengaged, continued counter-clockwise movement of the lever 420 shifts the segment 478 downwardly, causing the arcuate surface 477 to engage the stud 475 and rock the lever 473 counter-clockwise. This movement of the lever 473, through the link 472, rocks the arm 471, the shaft 339, and the arm 467 clockwise from subtracting position, as shown in Fig. 15, to adding position, as shown in Figs. 16 and 35, in which positions said arms and said shaft are retained by the pawl 495 in cooperation with the tooth 493. The sub-total and total control keys 74 (Fig. 22) cause the cams 489 and 490 (Fig. 14) to be positioned in their third and fourth positions, respectively, thereby causing said cams to position the lever 485 in its fifth or adding position, in exactly the same manner as explained above in connection with adding operations.

As explained previously, clockwise movement of the shaft 339 and the arm 467 to adding position, as shown in Figs. 16 and 35, causes the surface 468 on said arm to engage the stud 470 and rock the transfer pawl 435 counter-clockwise to adding position, and likewise causes the stud 466 in said arm 467 to engage the extension 465 to move the subtract operating arm 461 to ineffective position and simultaneously releasing the add operating arm 459 for operation, to drive the transfer segment 452 in an additive direction, as will be explained presently. Counter-clockwise movement of the shaft 339 and the arm 467 from adding position (Fig. 16) to subtracting position (Fig. 15) causes the surface 469 in the notch in the upper end of said arm 467, in cooperation with the stud 470, to rock the transfer pawl 435 clockwise from adding position to subtracting position.

Figure 11:
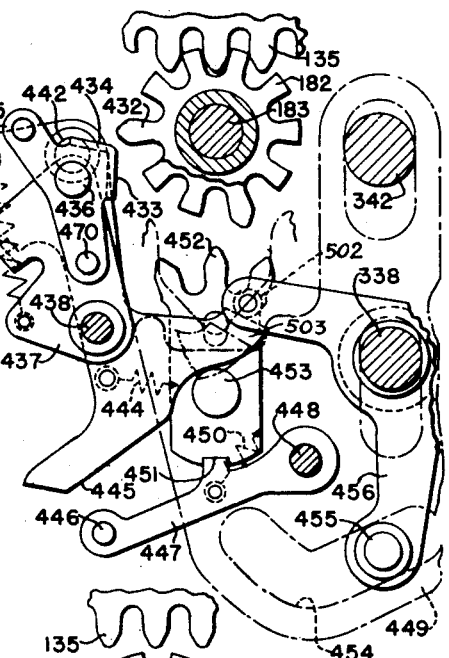
Fig. 11 is a right side elevation of one denominational order of the group totalizer line, showing one set of totalizer wheels engaged with the amount actuators and the transfer mechanism in tripped position.
Figure 12:
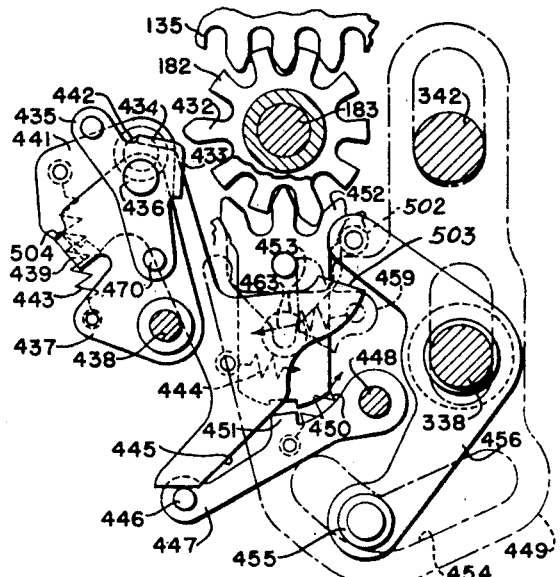
Fig. 12 is a right side elevation showing the group totalizer line partially disengaged and showing the detent for the transfer operating segment disengaged.

When the group totalizer line 183 (Figs. 7 and 10) is in disengaged position, the transfer segments 452 are in engagement with the teeth of the corresponding selected set of totalizer wheels 182. During engaging movement of the shaft 338 (Figs. 7 and 10), the contour of the slots 454 in the plates 449, in cooperation with the rollers 455 on the bell cranks 456, causes said plates 449 and the segments 452 to move upwardly in unison with the totalizer shaft 183, as shown in Fig. 12, to retain the selected set of totalizer wheels in alined position until they are fully engaged with the teeth of the amount actuators 135. After the selected set of totalizer wheels 182 have been engaged with the corresponding amount actuators 135, continued counter-clockwise movement of the shaft 338 and the bell cranks 456 causes the rollers 455, in cooperation with the slots 454, to shift the plates 449 downwardly in relation to the totalizer shaft 183 to disengage the teeth of the transfer segments 452 from the corresponding totalizer wheels, as shown in Fig. 11, so that said wheels may be actuated in the manner explained above.

As the plate 449 for the order being described moves full distance downwardly (Fig. 36) under influence of the bell crank 456, the stud 457 in the segment 452, cooperating with a camming slot 501 in the plate 337, having symmetrical opposed camming surfaces, restores said segment 452 from operated position, in either an additive or a subtractive direction, back to its central or untripped position, as shown here. Simultaneously with the restoring of the segment 452, full movement counter-clockwise of the bell crank 456 causes a stud 502 therein, in cooperation with a rearward extension 503 of the arm 441, to restore said arm clockwise until the shoulder 440 thereon moves beyond the upper edge of the bent-over ear 439 on the latch 437, whereupon the spring 443 restores the latch 437 clockwise into the path of said shoulder 440. Immediately after the transfer mechanism has been restored, the bell crank 456 is returned a slight distance clockwise from the full line position shown in Fig. 36 to the position shown in full lines in Fig. 11 and to the position shown in dot-and-dash lines in Fig. 36, so that the stud 502 is removed a slight distance from the extension 503 to provide room for tripping counter-clockwise movement of the arm 441 when the transfer mechanism is tripped, as will be explained presently.

When the transfer segment 452 (Fig. 36) is restored to its central or untripped position, as shown here, and the arm 441 has been restored clockwise to normal position, so that the surface 445 thereon is out of the path of the stud 446 in the detent 447, the spring 450 returns said detent clockwise to engage the tooth 451 thereon with the notch in the lower edge of the transfer segment 452, to retain said segment in restored position.

*Transfer mechanism in adding operations*

With the transfer mechanism restored and with the transfer pawl 435 in adding position, as shown in Fig. 36, rotation of the totalizer wheel 182 in an additive direction, by the amount actuator rack 135, from 9 position to 0 position, causes the long tooth 432 on said wheel, in cooperation with the surface 433 on the pawl 435, to rock said pawl counter-clockwise about a pivot formed by the surface 468 (Fig. 16) and the stud 470. This movement of the pawl 435 in turn rocks the latch 437 also counter-clockwise to disengage the ear 439 from the shoulder 440 to release the arm 441 to the action of the spring 444, which immediately rocks said arm counter-clockwise until the extension 503 contacts the stud 502, as shown in Fig. 11. After the actuator 135 has completed actuating movement to enter in the corresponding totalizer wheel 182 an amount corresponding to the value of the depressed amount key (compare spaces 3 and 4 of the time chart, Fig. 34), return clockwise movement of the bell crank 456 causes the roller 455, in cooperation with the slot 454, to move the plate 449 and the segment 452 upwardly to engage said segment with the teeth of the corresponding totalizer wheel 182, as shown in Fig. 12. Clockwise movement of the bell crank 456 likewise withdraws the stud 502 from the extension 503 of the arm 441, thus permitting the spring 444 to rock said arm full distance counter-clockwise, thereby causing the surface 445 to engage the stud 446 and rock the detent 447 downwardly to disengage the tooth 451 from the notch in the segment 452 for the next higher order, as shown in Fig. 12.

Figure 13:
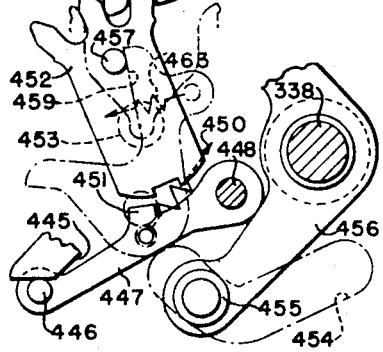
Fig. 13 shows the selected set of wheels on the group totalizer line disengaged from the actuators and shows the transfer operating segment in operated position, after having advanced the next higher order wheel one step to effect a tens transfer.

This releases the transfer segment 452 for the next higher orders to the action of the spring-actuated operating arm 459 (Fig. 16), and, as soon as the teeth of the corresponding totalizer wheel 182 are disengaged from the corresponding amount actuator 135, said arm 459, through the action of the spring 463, rocks said segment counter-clockwise from the position shown in Fig. 12 to the position shown in Fig. 13 to advance the next higher order wheel 182 one tooth space to transfer a tens digit from the next lower denominations. It will be noted, by referring to Fig. 12, that full tripped position of the arm 441 is determined by a shoulder 504 thereon coming into contact with the upper edge of the ear 439 on the latch 437.

The transfer segment 452 remains in operated position, as shown in Fig. 13, at the end of machine operation and also during engaging movement of the group totalizer line in the succeeding operation, to hold the corresponding totalizer wheel 182 in advanced position while totalizer selection takes place and until the selected set of totalizer wheels are engaged with the amount actuators 135. After the selected totalizer has thus been engaged with the amount actuators, continued counter-clockwise movement of the bell crank 456 shifts the plate 499 and the segment 452 downwardly, as explained in connection with Fig. 36, causing the slot 501, in cooperation with the stud 457, to restore the segment 452 from operated position to its central or untripped position, as shown here, and the stud 502 simultaneously restores the arm 441 to untripped position, as shown here, to move the surface 445 out of operating range of the stud 446, so that the spring 450 may again engage the tooth 451 with the notch in the lower edge of the segment 452 to retain said segment in untripped position.

By referring to Fig. 9, it will be seen that the contour of the slot 426 in the plate 68 is such that the upward or engaging movement of the shaft 338 and the totalizer framework is completed during approximately one-half of the initial or counter-clockwise rotative movement of said shaft 338 under influence of the lever 420, as explained above. The remainder of the rotary movement of said shaft 338 and the bell crank 456, from the position shown in Fig. 11 to the position shown in Fig. 36, is utilized, as explained above, to restore the segments 452 and the arms 441 to untripped positions. Likewise it will be seen, by referring to space 4 of the time chart, Fig. 34, which gives the engaging and disengaging movement of the group totalizer line in adding operations, that a slight over-movement is imparted to the shaft 338 and the bell cranks 456 to restore the tripped segments 452 and the arms 441, after which said shaft and said bell cranks 456 are returned a slight distance to the position shown in Fig. 11, and remain in this position until disengaging movement is imparted to the totalizer framework.

*Transfer mechanism in subtract operations*

In subtract operations, the shaft 339 (Fig. 15) is rocked counter-clockwise from adding position to subtracting position, as shown here, and the arm 467 moves in unison therewith, causing the surface 469 in the notch in the upper end of said arm, in cooperation with the stud 470, to rock the pawl 435 clockwise from the position shown in Fig. 16 to the position shown here, in which a stud 505 in the upper end of said pawl 435 is moved into contact with an upwardly-extending finger 506 on the plate 337. Counter-clockwise movement of the arm 467 also causes the stud 466 to be withdrawn from the extension 465 of the subtract operation arm 461 and to simultaneously engage the extension 464 of the add operating arm 459 to rock said arm clockwise from effective position to ineffective position, as shown in Fig. 15.

Rotation of the selected totalizer wheel 182 by the corresponding amount actuator 135 (Fig. 15) in a subtractive or counter-clockwise direction, from zero position to 9 position, causes the long tooth 432, in cooperation with the surface 434, to rock the pawl 435 clockwise against the fulcrum formed by the stud 505 and the finger 506. Clockwise movement of the pawl 435 rocks the latch 437 counter-clockwise to disengage the ear 439 from the shoulder 440 to trip the release arm 441, in the manner explained in connection with adding operations. Upon return upward movement of the plate 449 (Fig. 12) to engage the transfer segment 452 for the next higher order with the corresponding totalizer wheel, the arm 441 disengages the tooth 451 of the detent 447 from the notch in said segment 452 to release said segment to the action of the subtract operating arm 461 (Fig. 15). As soon as the teeth of the selected totalizer wheel 182 are disengaged from the teeth of the corresponding amount actuator 135, the operating arm 461, under influence of the spring 463, immediately rocks the transfer segment 452 in a clockwise or subtractive direction to move the corresponding totalizer wheel of the next higher order one tooth space in a subtractive or counter-clockwise direction to transfer a tens digit from said next higher order totalizer wheel to the next lower order totalizer wheel. The transfer mechanism is restored at the beginning of the succeeding operation in exactly the same manner as explained in connection with adding operations.

It will be noted by observing Fig. 17 that the arm 471 has in its lower end a stud 507 arranged to engage an alining notch 508 formed in the opening 497 in the plate 68 when said arm and the shaft 339 are in subtract position, as shown here, and when the group totalizer framework is in disengaged position. It will also be noted that the stud 507 is arranged to engage an alin'ng notch 509 in said plate 68 when said arm and the shaft 339 are in adding position and when the totalizer framework is in disengaged position, to secure said arm and the shaft 339 against displacement at these times.

Transfer mechanism in total and sub-total operations

In total and sub-total operations the cams 489 and 490 (Fig. 35) position the lever 485 in adding position, as here shown, to cause the transfer mechanism, including the arm 471 and the shaft 339, to be rocked to adding position, in which the trip pawls 435 are disposed in relation to the long teeth 432 of the corresponding totalizer wheels 182 as shown in Fig. 16. In total and sub-total operations the wheels of the selective totalizer are engaged with the actuators 135 prior to the initial movement of the actuators as shown by the time chart in Fig. 34. Therefore the initial movement of the actuators 135 rotates the wheels in a reverse or subtractive direction until such movement is terminated by the long teeth 432 engaging the surfaces 434 on the transfer trip pawls 435 as shown in Fig. 16. This rotates the selected set of wheels 182 in zero position and through the actuators 135 positions the corresponding type wheels (shown in Fig. 4) in accordance with the amount taken from the totalizer wheels.

Balance totalizer engaging mechanism

The balance totalizer shaft 181 (Figs. 18 and 19) is mounted in a framework which is shiftable vertically to engage and disengage the totalizer wheels 178 and 180 with and from the amount actuator racks 135. The shiftable totalizer framework comprises right and left end plates 544 and 545, which support the shaft 181, and an intermediate plate 546 (Figs. 6 and 18) for each denominational order, which support the transfer release arms and latches for the corresponding orders. The plates 544, 545, and 546 have slots which engage a stationary rod 547 supported between the plates 68 and 69 (Figs. 6, 18, and 19), and, in addition, said plates rotatably support a totalizer engaging shaft 548 (Fig. 19), opposite ends of which engage vertical slots in the plates 68 and 69 in exactly the same manner as the group totalizer engaging shaft 338 (Fig. 14). Likewise, the balance totalizer shaft 181 has bushings on opposite ends thereof which engage corresponding vertical slots in the plates 68 and 69 in exactly the same manner as the group totalizer shaft 183 (Fig. 14) to form a framework for the balance totalizer shaft and the tripping portion of the transfer mechanism, which is shiftable vertically.

The differential mechanism for the balance totalizer, like the differential mechanism for the group totalizers shown in Fig. 22, is split in two sections, one section of which controls the positioning of the totalizer shifting cam 538 (Fig. 23) to select the plus side or the minus side of the balance totalizer. The other section of the split differential mechanism for the balance totalizer controls the connection of the balance totalizer engaging and disengaging mechanism with the operating bars shown in Figs. 27, 28, and 29, to control the timing of the engaging and disengaging movement of the balance totalizer in exactly the same manner as explained in connection with the group totalizer.

The engaging bars 388 and 390 (Figs. 23, 27, 28, and 29) have bent-over portions on their forward ends forming engaging notches 549 and 550, and the add-engaging bar 392 has a notch 551, said notches arranged to be engaged by a stud 552 in the forward end of an engaging arm 553 free on a stud 554 in a crank 555 secured on the shaft 395.

The arm 553 is pivotally connected by a link 556 to a lever 557 free on a stud 558 supported by the frames 67 and 68. The lever 557 is pivotally connected by a link 559 to an arm 560 free on the shaft 395 and carrying a roller 561, which extends through and cooperates with a camming slot 562 in a segment 563 free on a stud 564 in the frame 67. The segment 563 has, on its upper edge, teeth meshing with a gear 565 free on a stud 566 secured in the frame 67. The gear 565 also meshes with teeth on the lower edge of a rack 567 (Figs. 23 and 29) mounted for horizontal shifting movement by means of parallel slots therein in cooperation with the rollers 519 and 520. The rack 567 pivotally supports a latch 568 having integral therewith an alining pawl 569, said pawl and said latch urged counter-clockwise by a spring 570 (Fig. 23) to normally maintain a tooth on said latch in the path of a shoulder formed on the upper edge of the differential drive plate 526. An upwardly extending arm of the latch 568 carries a stud 571, which cooperates with graduated steps 572 on the rearward end of a control lever 573 free on a stud 574 secured in a plate 575 in turn secured to the plate 82. The plate 575 and the lever 573 are similar in appearance to and function in exactly the same manner as the corresponding parts 350 and 348 (Fig. 25) for the group totalizers, the steps 572 on said lever 573 being exactly the same as the corresponding steps 351 on the lever 348 and cooperating with the stud 571 in exactly the same manner as said steps 351 cooperate with the stud 352 to control their corresponding latches 568 and 353.

Through the mechanism described above, the balance totalizer engaging movements are controlled by keys 74 and 75 in the manner fully described in the parent application.

Transfer mechanism in total and sub-total recording operations

By referring to Fig. 35, it will be recalled that, in sub-total and total recording operations, the cams 489 and 490 position the lever 485 in adding position, as shown here, to cause the transfer mechanism, including the arm 471 and the shaft 339, to be rocked to adding position, in which the trip pawls 435 are disposed in relation to the long teeth 432 of the corresponding totalizer wheels 182, as shown in Fig. 16. In total and sub-total recording operations, the wheels of the selected totalizer are engaged with the amount actuator racks 135 prior to initial movement of said actuators, which movement rotates said wheels in a reverse or subtractive direction until such movement is terminated by the long teeth 432 engaging the surfaces 434 on the pawls 435, as shown in Fig. 16. This locates the selected set of wheels 182 in zero position and, through the actuators 135, positions the corresponding type wheels in accordance with the amount on said wheels.

In total recording operations, the wheels 182 are disengaged from the actuators 135 prior to return movement of said actuators, and consequently said wheels remain in a zeroized condition at the end of machine operation. This type of operation is often referred to as a resetting operation as well as a total recording operation. In sub-total recording operations, the wheels 182 remain in engagement with the actuators 135, and return movement of said actuators restores said wheels to their original positions. This type of operation is often referred to as a reading operation as well as a sub-total recording operation.

*Tens transfer mechanism for the balance totalizer*

Inasmuch as the selected set of wheels, plus or minus, of the balance totalizer is always driven in an additive direction, the transfer mechanism need function only in an additive direction.

When the plus side of the balance totalizer is selected for actuation by the amount actuators 135, and if during this actuation a lower order plus wheel 178 (Figs. 6, 19, and 20) passes through zero, the transfer mechanism functions to advance the next higher order plus wheel one tooth space to effect the transferring of a tens digit thereto. When the minus side of the balance totalizer is selected for engagement with the amount actuators racks 135, and if during this actuation a lower order minus wheel 180 passes through zero, the transfer mechanism for the next higher order wheel is tripped and, upon functioning, advances the minus wheel for the next higher order one step, said wheel in turn through its reverse gear connection to its corresponding adding wheel moving said adding wheel one step in a reverse or subtractive direction to effect the transfer of a tens digit.

It is necessary to provide this type of totalizer with a "fugitive 1" mechanism for adding "1" in the lowest order minus wheel when the highest order minus wheel passes through zero and for adding "1" to the lowest order plus wheel when the highest order plus wheel passes through zero, in order to correct the amount standing on said totalizer wheels under these conditions. The transfer mechanism for the balance totalizer is similar in many respects to the transfer mechanism for the group totalizers, explained earlier herein, with the exception that no provision is made for shifting the tripping pawls of said balance totalizer transfer mechanism from adding position to subtracting position and vice versa, as the balance totalizer mechanism always functions in an additive direction. Inasmuch as the transfer mechanism is substantially duplicated in each denominational order, it is believed that a description of the mechanism of the one denominational order shown in side elevation in Figs. 6 and 19 will be sufficient.

Referring to Figs. 6, 18, 19, and 20, each denominational order of the balance totalizer has a transfer segment 627 having, in its upper edge, three teeth which cooperate with the teeth of the corresponding plus and minus wheels 178 and 189. The transfer segment 627 for the denominational order being described is pivoted on a stud in a corresponding order plate 628, there being such a plate for each denominational order. Each of the plates 628 has, in its upper end, a slot which engages the rod 547 and another slot which engages the shaft 548 to mount said plates for vertical shifting movement. A notch in the lower edge of the transfer segment 627 is normally engaged by a tooth 629 on a detent 630 free on a stud 631 in order plate 628. A spring 632 urges the detent 630 clockwise to normally maintain the tooth 629 in the notch in the segment 627 to restrain said segment 627 against the action of a spring 633 tensioned between a stud 634 in said segment and a stationary stud, which spring urges said segment counter-clockwise. The detent 630 (Figs. 6, 18, and 19) carries a stud 635, which underlies a surface 636 on the downward edge of a detent release arm 637 pivoted on a stud 638 in the plate 546 for this particular denomination. A spring 639 urges the arm 637 counter-clockwise to normally maintain a shoulder 640 thereon in engagement with a bent-over ear 641 on a transfer latch 642 pivoted on a stud 643 secured in the plate 546 for the next lower denomination.

The latch 642 has a bent-over ear 645, which cooperates with the long tooth on the plus wheel 178 for the next lower denomination when the plus side of the balance totalizer is alined with the amount actuators racks 135, and which cooperates with the long tooth on the minus wheel 180 for the next lower denomination when the subtract side of the balance totalizer is alined with the amount actuators 135.

Figure 29:
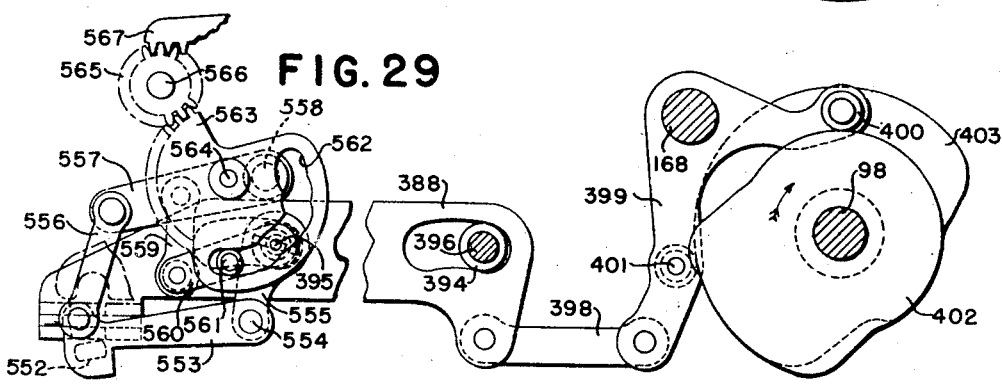
Fig. 29 is a detail view of the subtract and total engaging mechanism and the engaging control mechanism for the balance totalizer line.

Figs. 23 and 29 illustrate an engaging mechanism for the balance totalizer which is similar to and functions in exactly the same manner as the engaging mechanism for the group totalizer line, explained in detail earlier herein. The stud 552 in the engaging arm 553 is engageable with corresponding notches in the three engaging bars 388, 390, and 392, whereupon said bars operate the shaft 395, which is similar in every respect to the corresponding shaft 379 (Figs. 8 and 9) for the group totalizer line. The shaft 395, through a lever (not shown) similar to the lever 420 and an arm (not shown) similar to the arm 423, operates the shaft 548 (Fig. 19) rotatively back and forth, causing rollers carried by cranks (not shown) secured on said shaft, in cooperation with camming slots similar to the slots 426 for the group totalizer, to shift the balance totalizer framework, including the plates 544, 545, and 546 (Figs. 6 and 18), the shaft 181, which supports the balance totalizer wheels, and the shaft 548 (see also Fig. 19), up and down to engage and disengage the wheels of the balance totalizer with and from the amount actuators 135 in proper timing. Secured on the shaft 548 is a bell crank 646 (Fig. 19) for each denominational order, similar in every respect to the bell crank 456 for the group totalizer line (Fig. 7), said bell crank 646 carrying a roller 647, which cooperates with a camming slot 648 in the lower edge of the corresponding plate 628, to shift said plate, the transfer segment 627, and the detent 630 up and down in relation to the balance totalizer framework.

The contour of the slot 648 (Fig. 19) is such that the plate 628, the segment 627, and the detent 630 move upwardly in unison with the balance totalizer framework, to retain the teeth of said segment in engagement with the teeth of the selected totalizer wheel until the teeth of said wheel are engaged with the teeth in the corresponding amount actuator rack 135. After this, the plate 628 is returned downwardly to disengage the segment 627 from the totalizer wheel and to retain said segment disengaged until after the selected totalizer wheel has been actuated, whereupon the procedure outlined above is reversed. The reason for retaining the segment 627 in engagement with the selected balance totalizer wheel while said wheel is being engaged and disengaged is that this is the only means of holding said wheel in position at these times. A stationary aliner 649 (Figs. 6 and 18) is provided for each denominational order and has an alining bar which engages the teeth of the corresponding plus or minus totalizer wheel, which is not in alinement with the amount actuators 135, to retain said wheels in alinement.

In either adding or subtracting operations in the balance totalizer, the selected plus or minus wheels are engaged with the amount actuators racks 135 in adding time. This is effected by the stud 552 in the arm 553 (Figs. 27 and 29) being engaged with the notch 551 in the add bar 392, which bar is actuated by the cams 414 and 415 in adding time, as graphically outlined in space 4 of the chart, Fig. 34. Initial movement of the shaft 548 (Figs. 6 and 19) causes the balance totalizer framework and the plate 628 for the denomination being described to move upwardly in unison until the corresponding totalizer wheels 178 or 180 are engaged with the corresponding amount actuator 135, after which continued rotative movement of the shaft 548 causes the roller 647, in cooperation with the slot 648, to move the plate 628 downwardly to disengage the segment 627 from said corresponding totalizer wheel.

Full counter-clockwise movement of the bell crank 646 causes a stud 650 in an upward extension thereof to engage a surface 651 on an extension of the detent release arm 637 to restore said arm clockwise, against the action of the spring 639, until a spring 644, tensioned between said lever and the latch 642, causes the shoulder 640 to by-pass the ear 641 on said latch, whereupon said latch retains said arm in untripped position. Full downward movement of the plate 628 (Figs. 6, 18, and 19), after the selected wheel of the balance totalizer has been engaged with the amount actuator, disengages the teeth of the segment 627 from said wheel and causes the stud 634 in said segment, in cooperation with a camming surface 652 (Fig. 6) formed by a notch in the plate 546, to restore the segment 627 to its control or untripped position, in which the tooth 629 of the detent 630 engages the notch in the lower end of said segment to latch said segment in untripped position, as shown here.

If the selected totalizer wheel, plus or minus, in the adjacent lower order passes through zero while being turned in a clockwise or additive direction by the corresponding amount actuator rack 135, the long tooth thereon engages the ear 645 on the latch 642 (Fig. 19) to rock said latch counter-clockwise against the action of the spring 644 to disengage the ear 641 from the shoulder 640. This releases the arm 637 to the action of the spring 639, which rocks said arm counter-clockwise until a shoulder 653 thereon engages the ear 641.

After the actuators 135 have completed their return movement and the selected totalizer wheel has been actuated, the shaft 548 and the bell crank 646 (Fig. 19), operating according to the time given in space 4 of the chart, Fig. 34, are returned clockwise, causing the roller 647, cooperating with the slot 648, to shift the plate 628 upwardly to engage the segment 627 with the selected totalizer wheel. After the segment 627 (Figs. 6 and 19) has engaged the selected totalizer wheel, and before said segment and the plate 628 have completed their upward movements, and also before the balance totalizer framework has begun to shift downwardly, the surface 636 on the tripping arm 637 engages the stud 635 and rocks the detent 630 counter-clockwise, against the action of the spring 632, to disengage the tooth 629 from the notch in the segment 627 to release said segment to the action of the spring 633. Continued return movement of the shaft 548 and the bell crank 646 shifts the balance totalizer framework downwardly to disengage the selected totalizer wheel from the corresponding amount actuator rack 135. Immediately after the selected totalizer wheel is disengaged from the corresponding actuator, the spring 633 urges the segment 627 counter-clockwise, causing the teeth therein, in cooperation with the teeth of said selected totalizer wheel, to advance the said wheel in an additive direction the equivalent of one tooth space to transfer a tens digit from a lower denomination to a higher denomination. The counter-clockwise or transferring movement of the segment 627 is limited by the stud 634 therein engaging a projection 654 formed by a notch in the upper edge of the plate 628. In the succeeding operation, the segment 627 and the arm 637 are restored, after the selected set of totalizer wheels have been engaged with the amount actuators 135, in the manner explained earlier.

"Fugitive 1" mechanism

In the type of balance totalizer with which the present machine is equipped, it is necessary to enter a "fugitive 1" in the lowest order wheel when the highest order wheel passes through zero, in order to correct the amount standing on the selected totalizer wheels. This entering of the "fugitive 1" is effected automatically by mechanism comprising a latch 656 for the highest order (Figs. 18 and 19), which is similar in every respect to the latch 642, said latch 656 being pivotally connected to the plate 546 for the highest order and having a bent-over ear which is arranged to be engaged by the long teeth on the plus and minus wheels 178 and 180 of the highest order for tripping said latch when said wheels pass through zero. A bent-over ear of the latch 656 cooperates with a shoulder on an arm 657, similar in every respect to the arm 637, said arm being pivoted to the left end plate 545 for the balance totalizer framework. The arm 657 carries a stud 658, which engages a slot in the upper end of a crank 659 secured on the left-hand end of a shaft 660 journaled in downward extensions of the plate 546 for the highest order and the right end plate 544. Secured on the right-hand end of the shaft 660 is a crank 661, similar to the crank 659, having in its upper end a slot engaging a stud 662 in an arm 663 for the lowest order, said arm being similar in every respect to the arm 637.

Figure 19:
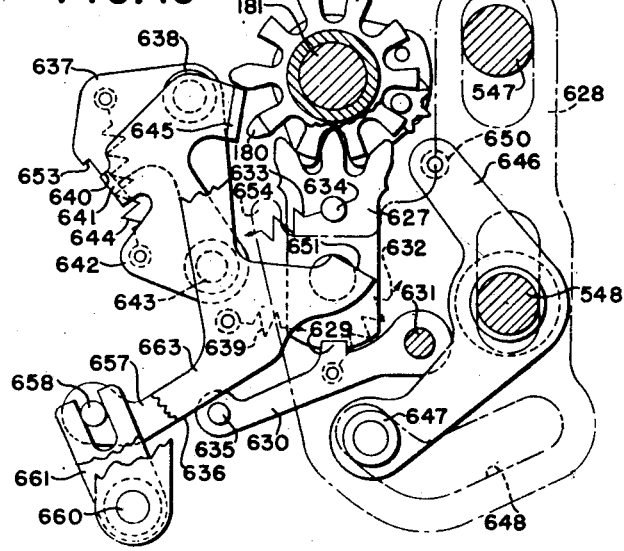
Fig. 19 is a detail view, as observed from the right, showing the highest order transfer mechanism for the balance totalizer.
Figure 20:
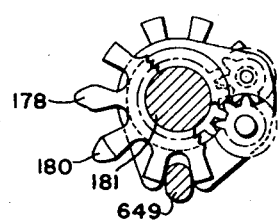
Fig. 20 is a detail view showing the manner in which the positive and negative wheels of one denominational order of the balance totalizer are geared together for reverse rotation.
Figure 27:
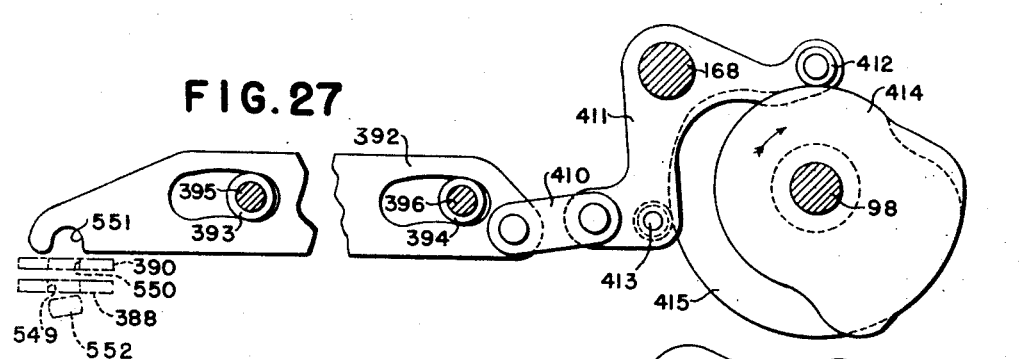
Fig. 27 is a detail view of the add engaging mechanism.
Figure 28:
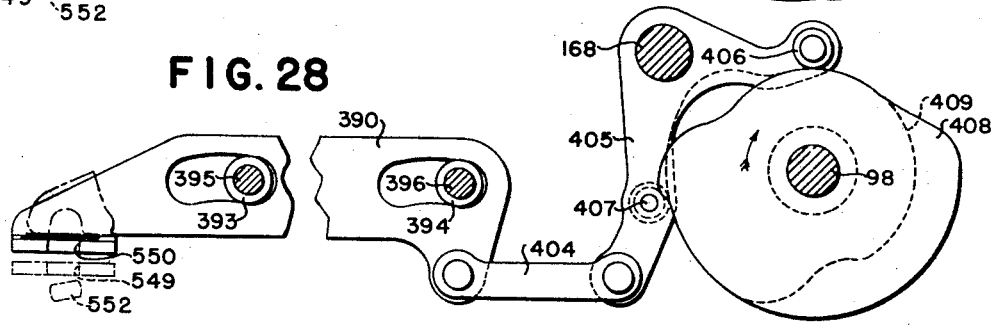
Fig. 28 is a detail view of the sub-total engaging mechanism.

Whenever the highest order plus or minus wheel 178 or 180 (whichever is selected) passes through zero, the long tooth thereon rocks the latch 656 out of engagement with the shoulder on the arm 657 to release said arm, the shaft 660, and the arm 663 (for the lowest order) to the action of their respective springs 664 and 665, which immediately urge said arms counter-clockwise, as viewed in Fig. 19. Counter-clockwise movement of the arm 663 causes the surface on its lower edge, in cooperation with the stud 635 for the detent 630 for said lowest denominational order, to rock said detent out of engagement with the transfer segment 627 for the lowest order, so that "1" will be entered in the plus or minus wheel 178 or 180, whichever is selected, for the lowest order of the balance totalizer, in order to correct the amount therein. The bell crank 646 (Fig. 19) for the highest order restores the arm 657, the shaft 660, and the arm 663 at the beginning of the succeeding operation, and the transfer segment 627 for the lowest order is restored by a camming surface in the plate 546 for said lowest order, in exactly the same manner as explained above in connection with Fig. 6.

In balance and sub-balance operations, which are initiated, respectively, by the depression of the balance key 75 and the sub-balance key 75 (Figs. 1, 19, and 23), the plus wheels 178 of the balance totalizer are engaged with the actuators 135 in total and sub-total timing, respectively, and are reversely rotated by said actuators until the long teeth thereon contact the upper edge of the ears 645 on the corresponding latches 642. This zeroizes the plus wheels 178 and positions their corresponding actuators in accordance with the amount standing thereon to record the balance or the sub-balance, as the case may be, upon the statement sheet 212.

In balance operations, the plus wheels 178 are disengaged from the amount actuators 135 (Figs. 18 and 19) prior to return movement of said actuators, and consequently said wheels remain in a zeroized position. In sub-balance operations, the plus wheels 178 remain in engagement with the amount actuators 135 during their return movements and are consequently returned to their original positions.

While the form of mechanism shown and described herein is admirably adapted to fulfill the objects primarily stated, it is to be understood that it is not intended to confine the invention to the one form or embodiment disclosed herein, for it is susceptible of embodiment in various forms all coming within the scope of the claims which follow.

What is claimed is:

1. In a machine of the class described, having a totalizer and an actuator, said totalizer having a gear wheel for each denominational order and being rotatable in one direction for addition and in the opposite direction for subtraction, each of said wheels having a long tooth for effecting transferring of digits and having means to engage and disengage said gear wheels with and from their actuators, the combination of a transfer gear segment for each totalizer wheel, except the lowest order wheel, said segments arranged to cooperate with the corresponding wheels and being rockable in one direction to transfer tens digits in adding operations and rockable in the opposite direction to transfer tens digits in subtracting operations, said gear segments being normally engaged with said gear wheels; means supporting said segments to move the latter with said wheels when the latter are moved into engagement with their actuators; means to actuate said supporting means to disengage said segments from said wheels prior to actuation of the wheels by the actuators and to actuate said supporting means to engage said segments with said wheels after actuation thereof by said actuators; means to drive the segments in an additive direction; means to drive the segments in a subtractive direction; means normally engaging the segments to retain the segments in a neutral position against the action of either of said driving means; a member for each denominational order shiftable to adding position to cooperate with the long tooth on the corresponding wheel and adapted to be operated by said long tooth in adding operations when said wheel passes through zero and shiftable to subtracting position to cooperate with the long tooth on the corresponding wheel and adapted to be operated by said long tooth in subtracting operations when said wheel passes through zero; a selectively controlled member to shift the shiftable members to adding or subtracting positions and to simultaneously enable the corresponding driving means and disable the other driving means; means intermediate each shiftable member and the retaining means for the transfer segment for the adjacent higher order, said intermediate means carrying the shiftable member whereupon the rotation of the lower order totalizer wheel causes its long tooth to operate said shiftable member to cause the latter to control said intermediate means to cause said intermediate means to disengage the retaining means to release the gear segment of the adjacent higher order for movement under influence of the driving means to transfer tens digits; and an element carried by the means which actuates said supporting means to prevent said intermediate means from disengaging the retaining means from said gear segment while said gear segment is disengaged from its corresponding wheel, said element releasing said intermediate means after engagement of the gear segment with its corresponding wheel.

2. In a machine of the class described having a totalizer with a gear wheel for each denominational order and an actuator for each gear wheel, said gear wheels being rotatable in one direction for addition and in the opposite direction for subtraction, each wheel having a long tooth for effecting the transferring of tens digits, and having means to engage and disengage said gear wheels with and from their actuators, the combination of a transfer gear segment for each wheel except the lowest order wheel, said segments being rockable in one direction to move the corresponding wheel one step in an additive direction, and rockable in the opposite direction to rock the corresponding wheel in a subtractive direction to effect the transfer of tens digits, said gear segments being normally engaged with their corresponding gear wheels; slidable means carrying said segments to move the latter with said wheels when the latter are moved into engagement with their acuators; slidable and rockable devices to actuate the slidable means to disengage the segments from the wheels prior to the actuation of the wheels by the actuators during the sliding movement of said device, and to actuate said slidable means to again engage said segments with the wheels after actuation thereof by their actuators; means to rock the segments in an additive direction; means to rock the segments in a subtractive direction; means normally engaging the segments to retain the segments in neutral positions against the actuation of either of the rocking means; a tripping member coacting with and adapted to be operated by the long tooth of a lower order gear wheel when said wheel passes through zero, said tripping member being shiftable from adding position to subtracting position, and vice versa, to properly cooperate with and be operated by said long tooth in adding operations and in subtracting operations; a selectively controlled member to shift the tripping member into an adding or subtracting position and simultaneously enable the corresponding rocking means and disable the other rocking means to effect the transfer of tens digits in adding and/or subtracting operations; means controlled by said tripping member and operable to disable said retaining means for the adjacent higher order segment upon operation of said tripping member and an element carried by the associated slidable and rockable device and adapted to cooperate with said means controlled by the tripping member to prevent the disabling of said retaining means for said adjacent higher order segment while said segment is disengaged from its corresponding wheel.

3. In a machine of the class described having an adding and subtracting totalizer comprised of a plurality of gear wheels, an actuator for the wheel of each denominational order, and totalizer engaging and disengaging means, the combination of gear segments normally in engagement with said wheels and rockable in adding and subtracting directions to advance their associated wheels in additive or subtractive direction to effect the transfer of tens digits; slidable members carrying said gear segments; slidable and rockable devices to actuate said members to move said segments with the totalizer wheels when the latter are moved into engagement with their actuators upon sliding movement of said devices, and to disengage the gear segments from the wheels prior to actuation of the wheels by their actuators upon rocking movement of said devices and to again actuate the sliding members to again engage said segments with said wheels after actuation of said actuators upon rocking movement of said devices; driving means to rock the segments in an additive direction; driving means to rock the segments in a subtractive direction; latch members engaging said segments to retain the segments in neutral positions against the action of said driving means; tripping members for cooperating with the long teeth on said wheels and having two positions of adjustment, one for addition and the other for subtraction, and adapted to be tripped by the long teeth on the wheels when in the add position and amounts are being added into the totalizer and adapted to be tripped by the same long teeth when in the subtracting position when amounts are being subtracted from the totalizer and acting as a zero stop for the totalizer wheels when setting in the add position when the totalizer wheels are being moved in a subtractive direction; a selectively controlled member to shift said transfer trip members to adding or subtracting position and to simultaneously enable the corresponding driving means and disable the other driving means; means intermediate said latching members and said tripping members whereupon the rotation of a lower order wheel causes its long tooth to operate the corresponding trip member whereupon the corresponding intermediate means disengages the latch member for the next higher order to release its corresponding segment for movement under influence of the driving means to transfer tens digits; means carried by said slidable and rockable devices and cooperating with said intermediate means to prevent disengagement of said latch member while the gear segment is disengaged from the totalizer wheel, and adapted to release said intermediate means after said gear segment is engaged with the totalizer wheel upon rocking movement of said device.

4. In a machine of the class described having an adding and subtracting totalizer comprised of a plurality of gear wheels, an actuator for the wheel of each denominational order, and totalizer engaging and disengaging means, the combination of gear segments normally in engagement with said wheels and rockable in adding and subtractive directions to advance their associated wheels in additive or subtractive direction to effect the transfer of tens digits; slidable members carrying said gear segments; slidable and rockable devices to actuate said members to move said segments with the totalizer wheels when the latter are moved into engagement with their actuators upon sliding movement of said devices, and to disengage the gear segments from the wheels prior to actuation of the wheels by their actuators upon rocking movement of said devices and to actuate the sliding members to again engage said segments with said wheels after actuation of said actuators upon rocking movement of said devices; rockable driving means to rock the segments in an additive direction; rockable driving means to rock the segments in a subtractive direction; latch members engaging said segments to retain the segments in neutral position against the action of said rockable driving means; tripping members for cooperating with the long teeth on said wheels and having two positions of adjustment, one for addition and the other for subtraction, and adapted to be tripped by the long teeth on the wheels when in the add position and amounts are being added into the totalizer, and adapted to be tripped by the same long teeth when in the subtracting position when amounts are being subtracted from the totalizer and acting as a zero stop for the totalizer wheels when setting in the add position when the totalizer wheels are being moved in a subtractive direction; a selectively controlled member to shift said transfer trip members to adding or subtracting position and to simultaneously enable the corresponding rockable driving means and disable the other rockable driving means; means intermediate said latching members and said tripping members whereupon the rotation of a lower order wheel causes its long tooth to operate the corresponding trip member whereupon the corresponding intermediate means disengages the latch member for the next higher order to release its corresponding segment for movement under influence of the driving means to transfer tens digits; means carried by said slidable and rockable devices and cooperating with said intermediate means to prevent disengagement of said latch member while the gear segment is disengaged from the totalizer wheel, and adapted to release said intermediate means after said gear segment is engaged with the totalizer wheel upon rocking movement of said device; and means to slide and rock said slidable and rockable devices.

RAYMOND A. CHRISTIAN.

REFERENCES CITED

The following references are of record in the file of this patent:

UNITED STATES PATENTS

| Number | Name | Date |
| --- | --- | --- |
| 1,767,674 | Horton | June 24, 1930 |
| 1,810,213 | Johantgen | June 16, 1931 |
| 2,158,142 | Muller | May 16, 1939 |
| 2,221,861 | Butler | Nov. 19, 1940 |
| 2,274,853 | Spurlino et al. | Mar. 3, 1942 |